Oct. 19, 1965 R. J. S. BROWN ETAL 3,213,356

METHODS FOR INVESTIGATING THE PROPERTIES OF FLUID (MATERIALS) WITHIN POROUS MEDIA

Filed Oct. 22, 1962 13 Sheets-Sheet 1

INVENTORS
ROBERT J. S. BROWN
HENRY C. TORREY
JAN KORRINGA
BY
ATTORNEYS

INVENTORS
ROBERT J. S. BROWN
HENRY C. TORREY
JAN KORRINGA
BY [signature] [signature]
ATTORNEYS INVENTORS
ROBERT J. S. BROWN
HENRY C. TORREY
JAN KORRINGA
BY *F. E. Johnston*
*George W. Wasson*
ATTORNEYS INVENTORS
ROBERT J. S. BROWN
HENRY C. TORREY
JAN KORRINGA
BY F. E. Johnston
George W. Wasson
ATTORNEYS NUCLEAR MAGNETIC RELAXATION CURVES FOR WATER IN NEVADA WHITE SILICA SAND, 135 MESH, AT 27° C.

INVENTORS
ROBERT J. S. BROWN
HENRY C. TORREY
JAN KORRINGA
BY *[signature]*
*George W. Wasson*
ATTORNEYS

RELAXATION RATE DUE TO SURFACE EFFECT AS FUNCTION OF RECIPROCAL GRAIN DIAMETER.

INVENTORS
ROBERT J. S. BROWN
HENRY C. TORREY
JAN KORRINGA
BY F. E. Johnston
George W. Wasson
ATTORNEYS RELAXATION CURVE FOR SAMPLE OF CRUDE OIL. (NOTE: TOTAL SIGNAL AMPLITUDE CORRESPONDED TO ONLY 0.75 THE PROTON DENSITY OF WATER.)

INVENTORS
ROBERT J. S. BROWN
HENRY C. TORREY
JAN KORRINGA
BY F. J. Johnston
George W. Wasson
ATTORNEYS

PLOT TO OBTAIN DISTRIBUTION OF COMPONENTS OF RESPONSE FUNCTION FOR CRUDE OIL.

INVENTORS
ROBERT J. S. BROWN
HENRY C. TORREY
JAN KORRINGA
BY [signature]
[signature: George W. Wasson]
ATTORNEYS NUCLEAR MAGNETIC RELAXATION CURVE FOR NEVADA #135 SAND (UNTREATED) SATURATED WITH WATER AND FLUSHED WITH STANDARD #250 THINNER. FLUID: 31% WATER - 69% THINNER INVENTORS
*ROBERT J. S. BROWN*
*HENRY C. TORREY*
*JAN KORRINGA*
BY [signature] Johnston
[signature] George W. Wasson
ATTORNEYS RELAXATION CURVE FOR A GROUP OF PROTONS IN A SAMPLE OF SAND SATURATED WITH WATER AND FLUSHED WITH THINNER. (THIS CURVE IS DERIVED FROM FIG. 11 BY SUBTRACTING 0.658 EXP. [-t/1.26] AND RENORMALIZING TO UNITY FOR t=0.)

INVENTORS
*ROBERT J. S. BROWN*
*HENRY C. TORREY*
*JAN KORRINGA*
BY
*[signature]*
*George W. Wasson*
ATTORNEYS NUCLEAR MAGNETIC RELAXATION CURVES FOR STANDARD OIL Nº 250 THINNER IN NEVADA WHITE SILICA SAND, 135 MESH.

INVENTORS
ROBERT J. S. BROWN
HENRY C. TORREY
JAN KORRINGA
BY [signature] [signature: George W. Wasson]
ATTORNEYS INVENTORS
ROBERT J. S. BROWN
HENRY C. TORREY
JAN KORRINGA
BY [signature] Johnston
George W. Wasson
ATTORNEYS INVENTORS
ROBERT J. S. BROWN
HENRY C. TORREY
JAN KORRINGA
BY
George W. Wasson
ATTORNEYS 3,213,356

METHODS FOR INVESTIGATING THE PROPERTIES OF FLUID (MATERIALS) WITHIN POROUS MEDIA

Robert J. S. Brown, Fullerton, Calif., Henry C. Torrey, Highland Park, N.J., and Jan Korringa, Columbus, Ohio, assignors to California Research Corporation, San Francisco, Calif., a corporation of Delaware Filed Oct. 22, 1962, Ser. No. 232,193
12 Claims. (Cl. 324—.5)

This application is a continuation-in-part of our copending application Serial No. 562,229 filed Jan. 30, 1956, for Method of Investigating the Surface Properties of Fluids, and now abandoned.

The present invention relates to a method of investigating properties of fluids by nuclear magnetism and, more particularly, to a method of investigating the properties of fluids in porous media, whether said media are solid or liquid or a combination thereof, by measuring nuclear magnetism relaxation functions for formation fluids and identifying variations in said relaxation functions due to said fluids being in a porous medium.

This invention also relates to methods for determining the presence of hydrocarbons in an earth formation, the amount thereof, and the gravity of the hydrocarbons.

This invention also relates to methods for determining nuclear magnetism properties of fluids in bulk and of fluids distributed in porous media, and more particularly to methods for using these properties to determine wettability characteristics of porous media, the total surface area of porous media, the surface-to-volume ratio of porous media and the pore size distribution of porous media.

The most important problem in oil well logging is the unambiguous detection of oil zones along the well bore. A combination of different methods of searching for possible oil producing zones along a well bore is used in many wildcat wells to insure, to the greatest extent possible, that such oil zones will be located.

It is desirable in oil well logging not only to detect oil zones unambiguously, but also to obtain information on formation permeability. Previously, there has been no satisfactory method for estimating formation permeability from well logs, and, in fact, as a general practice, this is not attempted. On the other hand, it is quite important that information on permeability be obtained, especially since it has been found in recent years that low permeability oil-containing zones may often be made commercial by treatment with some fracturing process. At present, some very rough estimate of formation permeability may be made with the aid of wall resistivity logs, such as the microlog and microlateral log, which measure formation factor.

Other characteristics of interest in connection with oil zones are the gravity, and gas-oil ratio, of the oil in the wells, particularly in offshore wells such as those along the gulf coast, where a wildcat may penetrate several oil zones, but only those zones having a low gas-oil ratio are commercial.

Another formation property of major interest in oil well logging is the porosity of the formation. Porosity information can be obtained from side wall samples whenever it is possible to obtain such samples. However, only a few samples generally are available and furthermore, the samples frequently are damaged extensively during the recovery process.

*Physical principles*

In order to explain the invention, it is first necessary to acquaint the reader with a few of the known facts about nuclear paramagnetism, and for this purpose we present the following rather brief statement. A more extended treatment can be found in several textbooks and review articles in scientific journals; the treatment that follows merely states the facts without adducing proof and omits many important features not of interest here.

A large number of atomic nuclei have an angular momentum that is, in accordance with well known laws of quantum mechanics, equal to an integer or half-integer multiple of Planck's constant $h$ divided by $2\pi$, which is currently symbolized by $\hbar$. If we write the angular momentum as $I\hbar$, then I is called the nuclear spin; it may have the value 0, ½, 1, 3/2, etc. A particular species of nucleus never changes its spin. Most nuclei with non-zero spin also have an invariant magnetic dipole moment, denoted by $\mu$. The only known relation between the angular momentum and the dipole moment is that the two, as quantities oriented in space, are always parallel to each other. The ratio between the two quantities, $\nu=\mu/I$ is called the gyromagnetic ratio.

When a system such as a quantity of a gas, a liquid or a solid containing one species of nucleus with a spin difference from zero is placed in a magnetic field H it acquires a nuclear magnetization. It takes a finite time before a state of thermal equilibrium is established, but once the thermal equilibrium is reached, the magnetization remains stationary as long as the magnetic field and other physical parameters, such as temperature and pressure of the system, are kept constant. Before this state is reached, and from the moment at which the magnetic field is established, the nuclear magnetization and therefore also the angular momentum experiences a motion that can be described as a precession influenced by forces of friction.

By a precession is meant here a motion in which a quantity, such as the angular momentum, remains constant in magnitude and changes its direction in space in such a manner that it describes a cone with constant angular velocity. The axis of this cone is parallel to the direction of the magnetic field H; the vertex angle of the cone depends on the state of affairs prior to the time at which the field was switched on, and the angular frequency $\omega$, which is called the Larmor frequency. The Larmor frequency is equal to $\nu H^*$ where $H^*$ is the magnetic field at the nucleus. $H^*$ and H are nearly equal, but nearby electrons cause a slight difference due to magnetic screening. For purposes of the following discussion, the star (*) will be omitted because the difference between H and $H^*$ is negligible for most of those purposes.

During a precessional motion, at least during a time short compared to the relaxation time, the component of the angular momentum, and therefore also of the magnetization, in the direction of the field is constant in magnitude. The component perpendicular to the field is also constant in magnitude but not in direction; it rotates with the angular frequency $\omega$. The influence of the frictional forces is to diminish the perpendicular component until it becomes zero, and to change the parallel component until it reaches a stationary value. It is convenient for what follows to express the state of affairs in terms of the nuclear polarization, symbolized by P, which is the nuclear magnetization divided by $\mu$. In the stationary state, the component, $P_1$, of P perpendicular to the field is zero, and the parallel component, $P_{11}$, is equal to $$\tfrac{1}{3}(n\mu/K\theta)(I+1)/I$$

where $n$ is the number of nuclei per unit volume of the species considered, $\theta$ is the absolute temperature in degrees Kelvin and K is Boltzmann's constant.

When more than one species of nucleus with a spin different from zero is present in the system, each has its own precessing polarization. In this case, there are also known to be mutual forces of friction that couple the changes in the precessional motion of different species. Strictly speaking, one must even discriminate between nuclei of one species in different states of chemical binding in the molecules; slight differences in magnetic screening by the electrons for chemically inequivalent nuclei cause a difference in the precession frequency. This effect is known as chemical shift.

The phenomenon that is caused by the forces of friction and by which the system is enabled to approach thermal equilibrium, is called relaxation. Due to the smallness of the nuclear magnetic dipole moments, the nuclear magnetization is too small to be measured easily with static methods. Most of the techniques designed to detect and use the behavior of nuclei in bulk matter in magnetic fields, including the present invention, take advantage of the existence of a finite response time connected with relaxation by subjecting the system to alternating fields or to fields that are changed abruptly from one value to another or to combinations of these together with constant fields. In particular it has been found possible, by other investigators, and by the present inventors, to measure the mean value of the magnitude of the two components of the nuclear polarization parallel and perpendicular to an applied magnetic field for a nuclear component present in the system, averaged over the precession period. As the changes due to relaxation are, in most cases of interest, very small in such a time-interval, one is thus substantially able to measure these two components as a function of time. These time functions depend on the manipulation with external fields that cause relaxation to set in, on the manipulations that are involved in the detection, and on the properties of the system, particularly, the forces of friction that are produced by the internal mechanism by which it strives to equilibrium. These time functions contain, therefore, information about the system.

In order to elucidate the nature of the information about any system containing nuclear species that can be obtained with the equipment described in the following pages, and with other apparatus, we will now discuss an idealized case. We will assume that prior to a time $t=0$ the system has attained thermal equilibrium while subjected to a constant homogeneous magnetic field. At $t=0$ this field is changed instantly in magnitude as well as in direction, and the components of the polarization of a nuclear species parallel and perpendicular to this field are measured from $t=0$ on. The change in the course of time, of the two components of polarization of the nuclei, from the equilibrium value in the first field to the equilibrium value in the second field, is detected as it occurs in the presence of the second field that is constant in time and homogeneous. This second field will be called the relaxation field. This procedure is not always advisable, and it may be difficult to carry it out with sufficient accuracy to allow any measurement at all, or other conditions may conflict with these requirements, but it is used here only to illustrate the nature of the obtained information, and in this respect it is of sufficient generality. From these measurements we can obtain two time functions:

$$R_1(t)=(P_{11}(t)-P_{11}(\infty))/(P_{11}(0)-P_{11}(\infty))$$

and $$R_2(t)=P(t)/P(0)$$

Here $$P(0) \text{ and } P(0)$$

are the two components of the equilibrium polarization in the first field, respectively, in the direction of, and perpendicular to, the direction of the second field; and $P_{11}(\infty)$ is the equilibrium value in the second field. $R_1(t)$ will be called the response-function for thermal (longitudinal) nuclear magnetic relaxation, $R_2(t)$ the response function for transverse relaxation. Though our invention implies both thermal and transverse relaxation, most of the discussion will deal with thermal relaxation, and for convenience the subscripts will be dropped, except where transverse relaxation is explicitly referred to. All terms refer to a particular nuclear species, and may occasionally be used for a nuclear component in a given state of chemical binding exclusively, but only if its precession frequency is distinct from that of other nuclei of the same species.

Investigations carried out by us have revealed important deviations from the normal relaxation that has been here described. These new discoveries were obtained with techniques to be described below by which the response functions of longitudinal and transverse relaxation, $R_1(t)$ and $R_2(t)$ respectively, for bulk fluids can be measured in relatively weak magnetic fields of the order of a few hundreds of gauss ranging from zero to 200. Prior to this, investigators have favored stronger fields, of 5000 gauss or higher, for such measurements. Besides measuring such relaxation functions of liquids in bulk, we have discovered that when said liquids are immersed in porous media of different kinds, and thus said liquids are placed in a state where they have a large surface-to-volume ratio, and a variety of surface conditions, the relaxation functions directly measure characteristics of both the liquids and surfaces.

A theory for these new phenomena, observed under such conditions, has been developed by the present inventors. Said phenomena provide a method for using apparatus described herein to analyze the state and the structure of fluids and the physical state and structure of surface layers.

*Objects*

The objects of this invention are to provide methods of and means for utilizing measurements of nuclear magnetic relaxation processes in one or more magnetic fields for: (1) the direct detection of oil in an oil bearing formation penetrated by a well bore; (2) the measurement of the viscosity of an oil while it is still in the oil bearing formation; (3) the determination of the relative and total quantities of oil and water present in a formation penetrated by a well bore; (4) the elimination of any nuclear magnetism signals from water contained in an earth formation having uniform pore size; (5) the determination of the oil gravity of crude oil present in an earth formation penetrated by a well bore; (6) and the determination of the presence within an earth formation of a fluid that is free to flow through the pores of the earth formation.

Further objects of the present invention are to provide methods of and means for utilizing measurements of nuclear magnetic relaxation processes for fluids within an earth formation for the determination of formation characteristics such as porosity, pore size distribution, permeability and wettability.

In order to help to explain our invention and the necessary background, we present the following drawings including figures numbered from 1 to 14, forming an integral part of the present specification, in which:

FIG. 1 is the basic circuit for a low-field nuclear magnetism apparatus.

FIG. 2*a*–2*h* shows some basic current forms used in obtaining relaxation curves.

Figure 1:
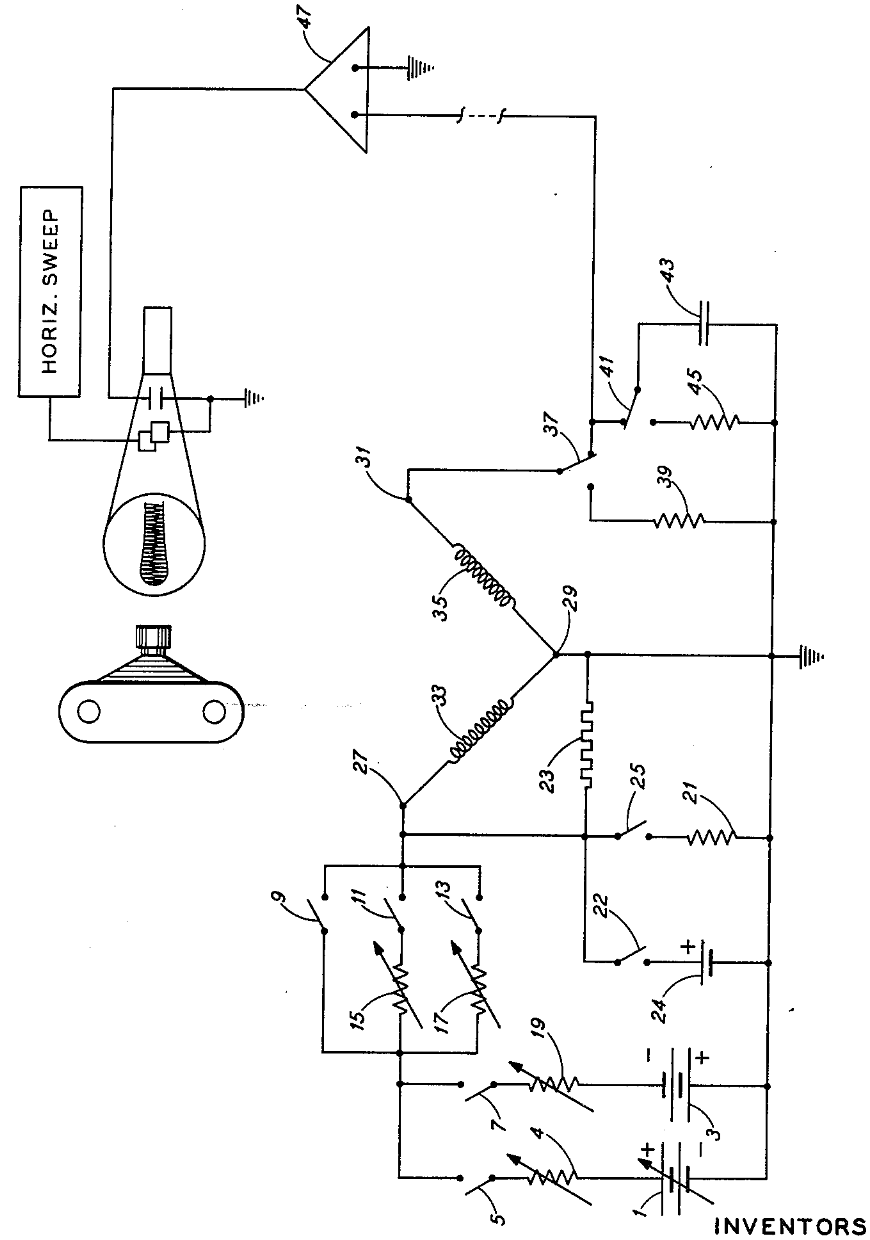

An important, but not comprehensive, class of practical methods for determining the response function, R($t$) for the thermal relaxation of nuclear magnetic polarization will now be outlined. A sample of material containing nuclear magnetic moments is subjected to the following general consecutive steps:

(1) Subject the sample to a reproducible time sequence of magnetic fields. This sequence is predetermined according to the purposes of measurement, in a manner to be described later. The sequence of fields may comprise continuously-varying, or step-wise-varying fields, including zero field, for prescribed lengths of time. (The purpose of step 1 is to produce a reproducible state of nuclear magnetic polarization not in equilibrium with $\overline{H}_r$, the relaxation field, in which it is desired to determine the course of relaxation.)

(2) Maintain the sample in the relaxation field $\overline{H}_r$ for a time $t$. [In order not to confuse transverse and thermal relaxation it is necessary that $\overline{H}_r$ be substantially parallel to the polarization at the end of step 1, or else that the relaxation field $\overline{H}_r$ be sufficiently inhomogeneous so that the polarization perpendicular to this field is quickly lost (and not refocused by any spin-echo procedure).]

(3) Subject the sample to a further reproducible time sequence of magnetic fields, which sequence is also determined according to the purposes of measurement.

(4) Observe a signal from the precessing polarization, this signal being a measure of the polarization P at the end of step 3. (The experimental result at the end of step 4 is a single value of the polarization P, which single value is dependent on the detailed procedures followed in the three preceding steps.)

The determination of the response function requires at least two values of the polarization, and preferably, many values. The additional values are determined by repeating steps 1 to 4 in every detail except that in each successive sequence of steps 1 to 4, a different value of $t$ is used in step 2. The plurality of values of P so measured will usually show that P varies as $t$ is varied, and the values of P may be said to define a function of $t$, which may be denoted by the symbol P($t$). It will be understood, of course, that the actual experimental values of P are dependent on other quantities beside $t$, but that these other quantities are held substantially constant, or reproduced identically, in the various repetitions of steps 1 to 4, so that the variation of P for the particular purposes at hand, is due only to the variation in $t$. The function P($t$), defined by the values of P measured for the various times, $t$, may be plotted as a graph or curve. The successive values may be otherwise represented, e.g., by automatic recorders, punch cards and the like. From the graph, or other representation, it will usually be possible to extrapolate the function in both directions, in order to obtain two particularly useful values of the function:

(1) the value that the function would have for $t=0$, which value may be denoted by the symbol P(0), and
(2) the asymptotic value that the function would have for exceedingly large values of $t$, which value may be denoted by the symbol P($\infty$).

In dealing with the data from experiments such as those described, it is sometimes convenient to convert the polarization data into a normalized form, which has a value of unity at zero time, and a value of zero at infinite time. Such a form is provided by the quantity:

$$S(t)=\frac{P(t)-P(\infty)}{P(0)-P(\infty)}$$

the values of which function are herein called the *relaxation curve*. The definition of the relaxation curve is analogous to that of the response function. In the special case in which the above described steps 1 to 4 are performed so that step 1 results in a substantially equilibrium state of polarization (though not in equilibrium with $\overline{H}_r$) and step 3 is omitted, the obtained relaxation curve S($t$) is identical with the response function R($t$).

*Apparatus for determining relaxation curves*

Figure 15:
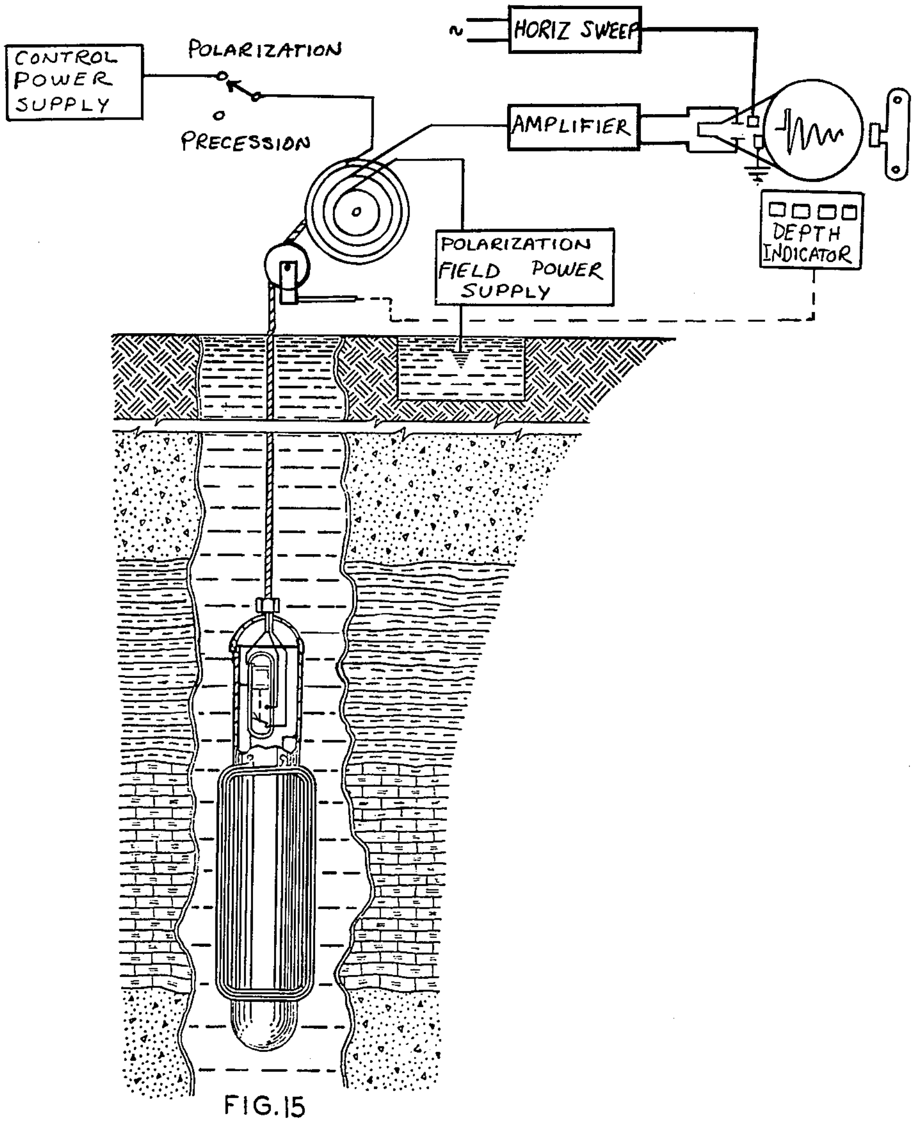
FIG. 15 is a schematic illustration of a nuclear magnetism well logging tool within a well bore penetrating an earth formation.

The well logging tool of our invention is illustrated schematically in FIGS. 1 and 15. FIG. 15 illustrates the tool within a well bore penetrating an earth formation while FIG. 1 illustrates the electrical components of the tool in schematic form.

In the basic circuit of our nuclear magnetism apparatus shown in FIG. 1, all the switches there shown—5, 7, 9, 11, 13, 22, 25, 37, and 41—are electrically operated relays. The timing circuits controlling them are not shown, because the construction of suitable timing circuits is a routine procedure for one skilled in the art of electronics.

FIG. 15 has grouped most of the switches in the block labeled Polarization Field Power Supply and has generally illustrated the function of switches 9, 11 and 13 by the Polarization and Precession contacts of the switch between the logging tool and the control Power Supply. FIG. 15 merely illustrates the generally essential features of a well logging tool for making the measurements necessary for the methods of the present invention. Details of the switching of the circuits of FIG. 1 will be described in connection with FIGS. 2*a*–2*h*.

Referring to FIG. 1, the inductance 33, called the polarizing coil, produces various magnetic fields required (in addition to a constant field, such as the earth's field) at the sample of matter being investigated. The inductance 35, called the pickup, or signal-receiving coil, has induced in it an electrical signal which is due to the precessing nuclear magnetic polarization in the sample. In our apparatus, the homogeneous field in which the nuclear magnetic polarization precesses is earth's field. Alternatively, this field can easily be supplied by Helmholtz coils or other artificial means.

The shapes of the coils 33 and 35 depend on the application to which the apparatus is to be put. For some sample types it is convenient to use solenoidal coils. Despite a slightly lower efficiency, we have found it desirable to use elongated coils of the form shown in FIG. 4A. With coils of this form it is possible to make measurements of signal amplitudes and relaxation curves for samples both internal, as in FIG. 4A, and external, as in FIG. 4*b*, to the coil assembly. An external sample occurs, as in FIG. 4B, for example, in the logging of an earth formation penetrated by a bore hole. Two separate coils are used for polarization and signal reception. The coils are desirably at right angles to each other in order to minimize the voltages induced in pickup coil 35 by the rapid flux changes through polarizing coil 33. The entire coil system is oriented with respect to the earth's field, or whatever field is used for the precession, so that the long dimension of the coil system has at least a component parallel to the external field. Thus each of the coils must be oriented so that the fields they produce have components not parallel to the external (earth's)

field. We have also observed the signal from the precessing polarization using only one coil for both polarization and signal pickup. When a single coil is used, points 27 and 31 of FIG. 1 are connected together, and either coil 33 or 35 is disconnected.

Referring again to FIGS. 4A and 4B, it may be pointed out that when two coils are used, the signals from internal and external samples are in opposite phase. When only one coil is used the signals from internal and external samples are in the same phase. If only internal samples are of interest, the most efficient coil arrangement comprises a single coil in the form of a solenoid.

In FIGS. 2*a* to 2*h* there are shown qualitatively a number of different ways in which it is desirable to control the polarizing field as a function of time to perform the method of the present invention. The heights $H_P$, $H_L$, etc. in FIGS. 2*a*–2*h* represent field strengths; horizontal distance represents time indicated as $T_P$, $T_L$, etc. In each part of FIG. 2 a time is marked $\tau=0$. This is the time when precession begins for the polarization to be measured. $\tau$ values greater than zero represent elapsed time during the detection and observation of individual signals due to previous polarizing procedures. In FIG. 2 several modes of variation of the field produced by the polarizing coil are shown, and in each case there are one, two, or three periods during which the field is held substantially constant. There are, of course, more general courses which the field could be made to take, but we show only a few of the most useful and simple ones.

The advantages of the various patterns shown in FIG. 2 will be described later, but, first, certain time requirements must be mentioned. If the direction of the total resultant magnetic field to which polarization is subject turns at an angular rate which is much greater than the value of the precession rate in the field, then the polarization will be unable to follow the change in direction of the resultant magnetic field. This is called a sudden change in direction of the magnetic field. If, however, the resultant magnetic field turns at an angular rate which is small compared to the precession rate in the field, then the polarization will turn with the magnetic field. This is called an "adiabatic" change in direction of the magnetic field. If the field is changed in direction adiabatically; and if, before the change, the polarization was precessing about the resultant field at a certain angle, then after the adiabatic change in direction (possibly accompanied by a change in magnitude) the polarization will still precess about the new resultant field at the same angle, with which it previously precessed about the original field.

All the field changes shown in FIG. 2 must be made in times short compared to the times $T_P$, $T_{P1}$, $T_{P2}$, and $T_L$ shown for the times of application of the various values of field strength produced by coil 33. When the field produced by the coil 33 crosses zero and when the field is brought to zero at $\tau=0$, the changes in direction of the resultant magnetic field must be sudden in the sense defined above for a substantial part of the change in direction.

Only the field produced by coil 33 is represented in FIGS. 2*a* to 2*h*. There is present also the earth's field with a direction component at right angles to the field produced by the coil 33. As long as the field produced by the coil 33 is strong compared to the earth's field, the change in direction of the resultant is very slight and, furthermore, the precession rate is very high in the strong field, making it almost impossible to vary the field so fast that the rate of change of direction of the resultant is comparable to the rate of precession of the nuclear magnetic polarization. Thus, the changes of the direction of the resultant field are adiabatic (or slow) as long as the field produced by coil 33 is strong compared to the earth's field. When the constant field in which the precession is observed is the earth's field, the requirement that the direction of the resultant field change suddenly for a substantial part of the change of the direction makes it desirable that the field produced by coil 33 change at a rate of about $10^5$ gauss per second during the time it is comparable in strength to the strength of the earth's field.

Figures 2A, 2B, 2C, 2D, 2E, 2F, 2G, 2H:
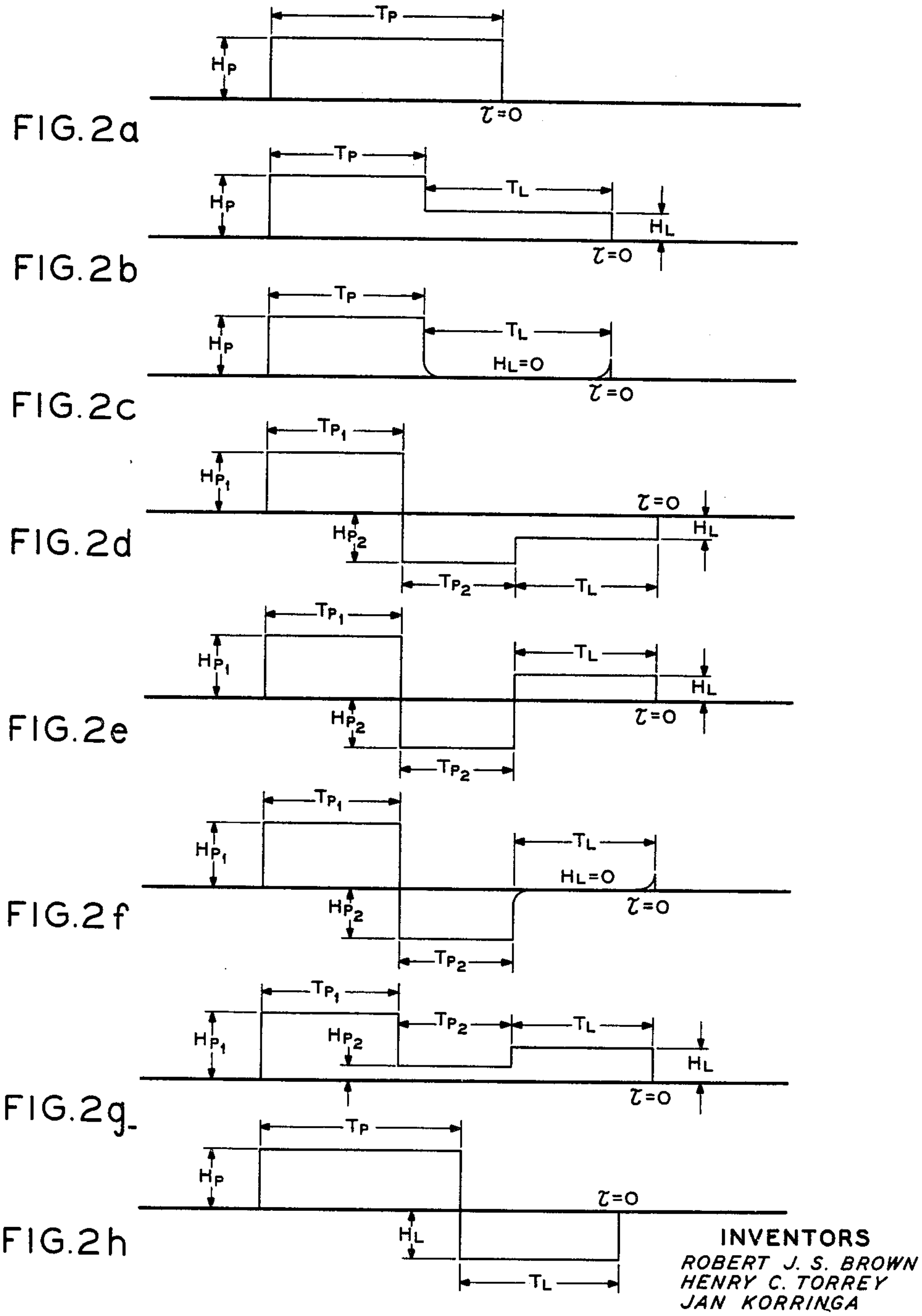

In FIGS. 2*c* and 2*f*, the field produced by coil 33 is reduced to zero adiabatically at the beginning of the time $T_L$, and it is brought up adiabatically to a few gauss (several times stronger than the earth's field) just before the end of the time interval $T_L$. Then at $\tau=0$ the field is suddenly reduced to zero. As was mentioned above, it is almost impossible not to make any changes adiabatically that are made when the field produced by coil 33 is strong compared to the earth's field. When it is desired to reduce the field of coil 33 to zero adiabatically, it is necessary to change the field by not more than the strength of the earth's field in a time which is that for several cycles of precession in the earth's field. The precession frequency in the earth's field for protons is on the order of two kilocycles, and the earth's field is about one-half gauss. It is thus desirable to change the field produced by coil 33 at a rate of not more than about 300 gauss per second when the field of coil 33 has a strength comparable to that of the earth's field.

With further reference to FIGS. 2*c* and 2*f*, the times at which the field adiabatically changes when comparable in strength to the earth's field are indicated by a curved line rather than square corners. In these two particular cases the polarization before the beginning of the period $T_L$ is (as in all other cases of FIG. 2 also) substantially parallel to the field of coil 33, but at the beginning of the period $T_L$ the polarization follows in direction (not in magnitude) the adiabatically turning resultant of the field produced by the coil 33 and the earth's field. Thus, shortly after the beginning of the period $T_L$ all the polarization is oriented parallel to the earth's field. During this period the polarization does not precess, because only the part of the polarization which is perpendicular to the earth's field precesses. Just before the end of the period $T_L$ the polarization is made to follow the adiabatically turning resultant of the field produced by the coil 33 and the earth's field while the field of the coil is being slowly increased from zero to several gauss. After the field of the coil has reached several gauss the polarization then has once again a part which is not parallel to the earth's field. The field of the coil is suddenly reduced to zero, at which time the polarization begins to precess about the earth's field. The precessing polarization then induces an alternating signal in the pickup coil 35 which signal provides a measure of the polarization.

Returning to FIG. 1, it may be seen that there are substantially two separate circuits. To the left of point 29 is the circuit that controls the field producing polarization. To the right of point 29 is the signal detection circuit.

We will now describe operation of the circuit of FIG. 1 to produce the various current forms and hence the field in the region of the polarizing coil, as illustrated in FIGS. 2*a* to 2*h*.

FIG. 2*a*: Starting with all relays open except 5, resistor 4 in series with relay 5 is set so that the current through coil 33 will correspond to the desired field strength $H_P$. In this case, this is also the relaxation field $H_r$ in which the course of relaxation is to be determined. Then, relay 9 is closed at the beginning of time interval $T_P$ and opened at the end of this interval. Thus, in FIG. 2*a*, the time $T_P$ is also the time $t$ used in the relaxation curve.

FIG. 2*b*: Resistor 4 is adjusted to correspond to the desired field $H_P$ and resistor 15 is set to correspond to desired field $H_L$, and all relays except 5 are open. At the beginning of $T_P$ contact 9 is closed and soon thereafter so is contact 11. At end of $T_P$ contact 9 is opened, and at end of $T_L$ contact 11 is opened. In this case, either the field $H_P$ or the field $H_L$ can be the relaxation field and the corresponding times $T_P$ and $T_L$ can correspond to the time $t$ of the relaxation curve which is varied for repeated observations of the signal to determine various points on the relaxation curve for the porous media under observation.

FIG. 2*c*: Starting with only relays 5 and 25 closed, and adjusting resistor 4 as usual, relay 9 is closed at the beginning of $T_P$ and opened at the end of $T_P$. Then relay 25 is opened after current in coil 33 has dropped to zero. Just before $\tau=0$ relay 22 is closed for a short time (one or two milliseconds) and opened again at $\tau=0$. It is to be noted here that the field $H_L$ is zero, leaving only the earth's field. In this case, even with an external sample we can observe relaxation in a uniform field, whereas in all other cases with an external sample the relaxation field cannot be uniform (though most of the signal comes from a region over which the field varies in amplitude by a factor of about two). As in the program of FIG. 2*b*, either the field $H_P$, or the resultant of $H_L$, and earth's field can be used as the relaxation field.

FIG. 2*d*: Resistor 4 is set to zero; battery 1 adjusted for the desired value of $H_{P1}$; resistor 19 is set for $H_{P2}$ and resistor 15 adjusted for $H_L$. As before, all relays are open except relay 5. Relay 9 is closed to begin $T_{P1}$; relay 7 is closed just before (few milliseconds) the end of $T_{P1}$; relay 5 is then opened to end of $T_{P1}$. Relay 11 is then closed and relay 9 opened to end $T_{P2}$. At $\tau=0$, relay 11 is opened. Any of these three fields can be used as the relaxation field, with the corresponding time being varied in repeated observations of the signal and used as time $t$ in the relaxation curves.

FIG. 2*e*: The procedure is like that described for FIG. 2*d* until after the beginning of $T_{P2}$. Then the voltage of battery 11 is raised to the fixed voltage of battery 3. Resistor 4 is set to provide the desired value of $H_L$ (preferably less than $H_{P2}$). Just before (about a millisec.) the end of $T_{P2}$, relay 5 is closed. At end of $T_{P2}$ relay 7 is opened to begin $H_L$, and at $\tau=0$ relay 9 is opened.

FIG. 2*f*: As in FIG. 2*d*, the conditions are made the same until after the beginning of $T_{P2}$. Then, relay 25 is closed and at end of $T_{P2}$ relay 9 opens. Relay 25 then opens after current has dropped to zero. Just before $\tau=0$, relay 22 is closed to connect battery 24 to coil 33. This circuit is held for just long enough to permit field to build up a few gauss (a few millisecs.) and then opened at $\tau=0$.

FIG. 2*g*: With all switches open except 5, D.C. source 1 is set for a desired $H_{P1}$, resistor 15 is adjusted for $H_{P2}$, and resistor 17 is set for $H_L$. Closing of relay 9 begins $T_{P1}$; the closing of relay 11 and opening of relay 9 ends $T_{P1}$ and starts $T_{P2}$. Closing of relay 13 ends $T_{P2}$ and begins $T_L$. The opening of relay 5 is at $\tau=0$.

FIG. 2*h*: Like FIG. 2*d*, $H_P$ is applied for $T_P$ and $H_L$ is applied in the same manner as $H_{P2}$. Relay 9 is opened at $\tau=0$.

It will now be readily apparent from the previous specific examples how to obtain other desirable sequences of fields for measuring relaxation curves. Voltage source 3 must be large enough to produce a sudden (in above sense) change of magnetic field when the polarizing field (field produced by polarizing coil 33) is nearly zero. Voltage source 1 must be adjustable in moderate steps from nearly zero to about the voltage of source 3. It is desirable to use as high a voltage as possible, limiting the current through 1 or 3 to desired values by resistors 4 and 19, in order to cause the polarizing field to rise as fast as possible. The switches 5, 7, 9, 11, 13, and 22, are vacuum-insulated switches in our apparatus, though we have used other switches satisfactorily for some of them. Resistor 23 is a nonlinear resistor, such as thyrite, which limits the voltages developed across coil 33 when various switches are opened. It does not interfere with the "sudden" reduction of the polarizing current, in the sense of sudden used above. Suitable values for the components in the circuit of FIG. 1 are the following: variable source 1, 0–500 volts D.C.; source 3, 500 volts D.C.; and source 24, 1 volt. Resistor 21, 5 ohms; thyrite resistor 23, 600 volts at 55 amps. Polarizing coil 33, 1 ohm and 99 millihenries; pickup coil 35, 12 ohms and 0.13 henry. Resistor 39, 6.8K; resistor 45, 100 ohms; condenser 43 is adjustable, as required to tune coil 35 to nuclear precession frequency. Amplifier 47 has a low signal-to-noise ratio and high input impedance with a gain of about $10^4$.

It is desirable in our particular arrangement of coils to disconnect tuning condenser 43 from pickup coil 35 for a short period of time, ending a few milliseconds after $\tau=0$. This prevents transient electrical currents from pickup coil 35, induced by changes in the fields produced by polarizing coil 33, from producing other fields that would interfere with the required "sudden" removal of the polarizing fields. Relay 37 is used to open this parallel circuit between condenser 43 and coil 35. While tuning condenser 43 is disconnected, the pickup coil 35 is connected by relay 37 to a damping resistor 39 that absorbs much of the energy left in the fields of coil 35 at $\tau=0$. From the time of first application of a polarizing field until a few milliseconds after $\tau=0$, relays 37 and 41 are held in their energized positions. FIG. 1 shows these relays in their unenergized positions.

Figure 3:
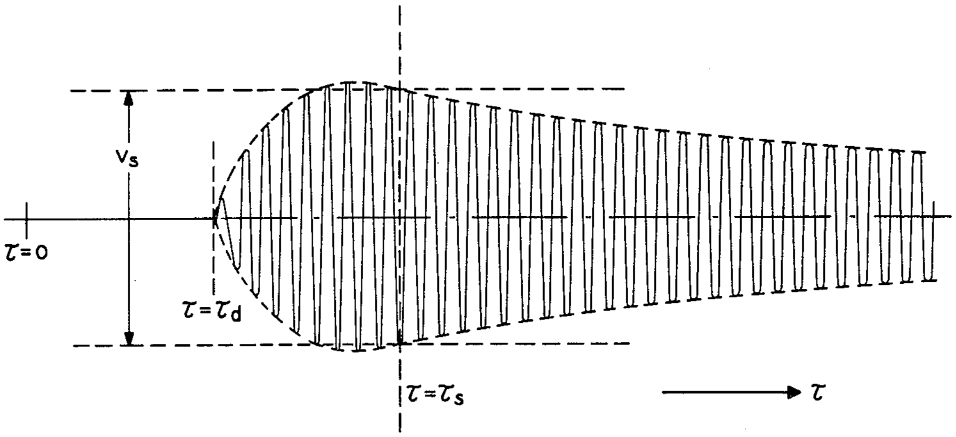
FIG. 3 is the signal form observed on an oscilloscope.

When free precession signals are measured, the signal is of the form shown in FIG. 3. No signal is observed until the time $\tau=\tau_d$. The signal must then build up in the resonant circuit comprising pickup coil 35 and tuning condenser 43 before the full signal voltage can be observed. To obtain a relaxation curve, the signal is observed a number of times for various values of the time $t$ for which the sample is maintained at the relaxation field $H_r$. For each observation of the signal the signal amplitude is measured at a time $\tau_s$ after the $\tau=0$. It is important that the times $\tau_d$ and $\tau_s$ be maintained constant.

In general, our measurements are made by displaying the signal as shown in FIG. 3 on the face of a cathode ray oscilloscope 48 and photographing the trace with camera 50. The photographs are then measured carefully. There are various other ways of obtaining the desired data from the output of the amplifier 47 without employing oscilloscope 48. For intsance, the rectified signal can be integrated over some interval of time from $\tau_s$ to $\tau_s=+\Delta\tau$. The output of the integrater circuit may then be read with a meter, or preferably the output is directly printed by a recording digital voltmeter. It is also possible by use of computer circuits to subtract the signals corresponding to $t=\infty$ and to divide by the signal for $t=0$ in order to obtain directly relaxation curves as the output of the detecting circuit. This output may also be converted for display as the logarithm of the relaxation curve, plotted as a function of the time $t$ for which the relaxation field $H_r$ is applied. As will be shown later, it is often convenient to plot the relaxation curves on semi-log graph paper or to plot the logarithm of the relaxation curve versus $t$.

It will now be useful to mention several simple types of response functions, and to show convenient methods for determining their natures by obtaining experimental relaxation curves.

In many cases it is known from the nature of the porous media under investigation that its response function must be approximately a single exponential function, but with an unknown relaxation rate. Ordinarily, then, it is desired to determine two things by making measurements: the number of protons (or other nuclei having magnetic moments) in the fluid phase, and the relaxation rate, or relaxation time. It may be desired to know the relaxation rates for various values of $H_r$, the relaxation field. If the relaxation field is over about half of the maximum obtainable polarizing field, then the method FIG. 2*a* is the simplest. If the desired relaxation field is less than this amount, but greater than the earth's field, then the method of FIG. 2*b* is applicable; and if one wishes data for a relaxation field substantially equal to the earth's field, then the method of FIG. 2*c* applies. In the last two cases (FIGS. 2*b* and 2*c*) the polarizing field $H_P$ preferably is applied for a definite time, $T_P$, for several relaxation times; the relaxation field $H_L$ is applied for different intervals of time $T_L=t$ and successive observations are made of the signal to determine successive points on the relaxation curve. In the special case for porous media, where the response function has a single component, the relaxation curve is identical with the response function. The number of protons, or whatever species of nuclei is of interest, is ordinarily determined from the signal with $T_P$ many relaxation times and $T_L=0$.

The situation sometimes arises where it is known that the response function of a sample includes a component of unknown amplitude but of definitely known relaxation rate. In this case, it is possible to eliminate completely the one component by one of the methods of FIGS. 2*d* to 2*g* inclusive, wherein field $H_L$ is used as the relaxation field $H_r$ and the time $T_L$ is time $t$. For simplicity, the field $H_{P1}$ is applied long enough to establish equilibrium for the nuclear magnetic polarization. The field is then reversed to establish field $H_{P2}$. During the time $T_{P2}$ the components of polarization, corresponding to the various relaxation rates, approach values corresponding to equilibrium with the field $H_{P2}$. Then, knowing the relaxation rate of the component of the relaxation curve to be eliminated, one may end the period $T_{P2}$ just when this component of the polarization is that which would be in equilibrium with $H_r$. Since components of the response function are all positive, the components of the resulting relaxation curve are still positive for relaxation rates lower than that of the component eliminated. The more rapidly relaxing components are negative.

It is often known in advance that the response function for a sample is composed substantially of two components of unknown relaxation rates. Likewise, the amplitudes of the two components may also be unknown. There are several ways of determining these separate components experimentally. If the two relaxation rates differ by a large factor, there is no difficulty in determining the two relaxation rates and the amplitudes of polarization in the two components. The procedure in this case is merely to record, or plot, on semi-log graph paper, the relaxation curve obtained experimentally to approximate the response function. For large values of $t$ the logarithm of the relaxation curve approaches a straight line corresponding to a smaller relaxation rate. If this straight-line part of the curve is extrapolated to $t=0$, the intercept is equal to the fraction of the initial polarization corresponding to the smaller relaxation rate.

When the two relaxation rates are different by only a small factor the determination of the relaxation rates and the relative amounts is more difficult and requires relaxation data from measurements with a good signal-to-noise ratio. It is then desirable to determine experimentally several different types of relaxation curves. First a relaxation curve approximating the response function should be obtained (for example, by methods illustrated in FIGS. 2*a*–2*c* and 2*h*). If the relaxation curve is of the form $S(t)=q \exp(-r_1t)+(1-q)\exp(-r_2t)$, then the initial slope of the curve is minus $qr_1+(1-q)r_2$, which is the weighted average of the relaxation rates and will be denoted $r_0$. The function $$\frac{+\log S(t)}{t}+r_0$$

may be plotted and approximated by a few terms of a power series, and information concerning the $r_1$, $r_2$, and $q$ may be obtained from these coefficients when $r_1$ and $r_2$ are close to $r_0$.

Figures 5, 6:
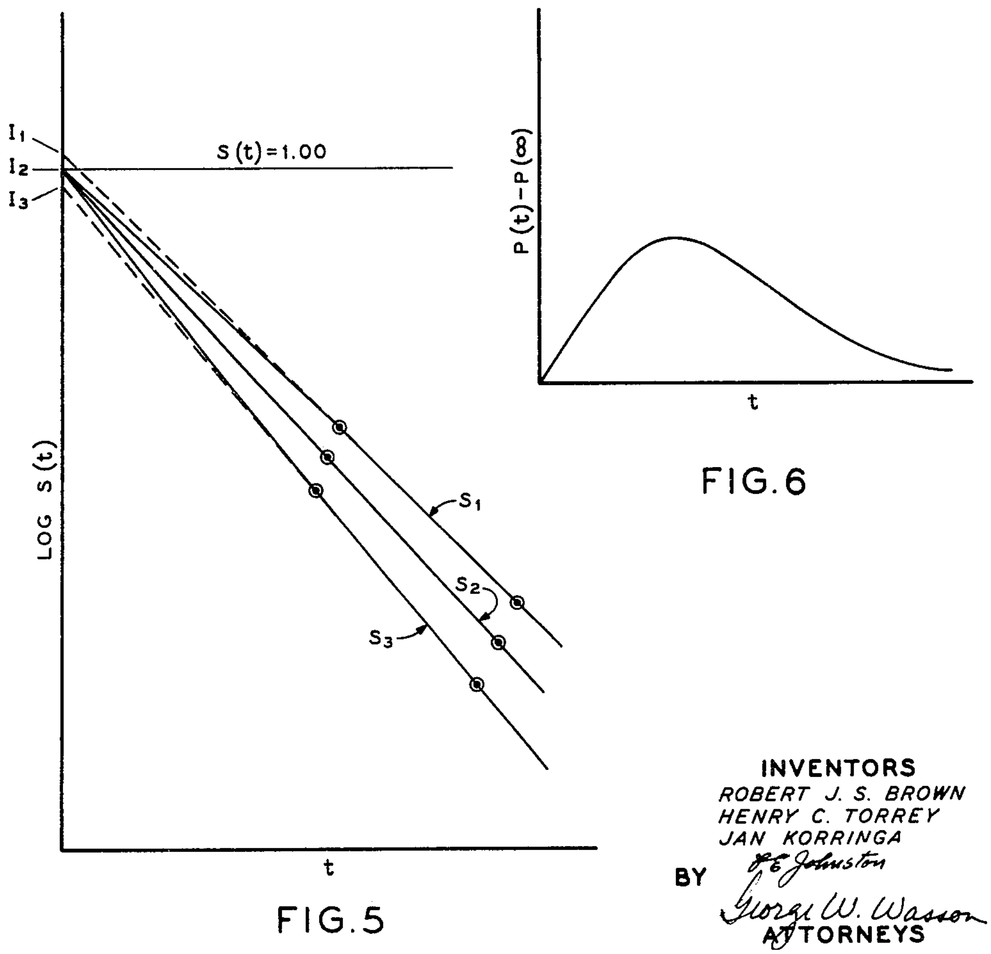
FIG. 5 shows relaxation curves from which a component is being eliminated.
FIG. 6 is a polarization curve observed when the initial polarization is eliminated.

Further useful data may be taken in this case of the system known to contain two components of unknown relaxation rates and unknown amplitudes by taking relaxation curves such that at least one component is zero or negative. These procedures correspond to those shown in FIGS. 2*d*–2*g* inclusive where $H_L$ is the relaxation field, and where preferably $H_{P2}$ is a strong negative field. The duration or strength of $H_{P2}$ is varied until the relaxation curve is a straight line, in which case one of the components of the relaxation curve will have been eliminated completely. To determine this setting of the duration or strength of $H_{P2}$ one need determine only three points of the curve $S(t)$ corresponding to each set. Several such curves are shown in FIG. 5. Curves $S_1$, $S_2$, and $S_3$ are all plotted to pass through $S(t)=0$ at $t=0$. The dashed lines are straight lines drawn through the experimental points shown by the circles. In the case of the curve $S_3$, the field $H_{P2}$ was not applied quite long enough to eliminate the more rapidly relaxing component (where "eliminate" means for this purpose to make the polarization equal to the amount of this component of polarization in equilibrium with $H_r$) from the relaxation curve. Therefore, the dashed line through the points on $S_3$ intersects the line $t=0$ at a point $I_3$ less than one. For the curve $S_3$ the field $H_{P2}$ was applied just too long to cancel the more rapidly relaxing component in $S(t)$, and the intercept $I_3$ is at a value of $S(0)$ greater than one. The curve $S_2$ is a straight line, and the line drawn through the experimental points passes through the point $S(0)=1.0$. The relaxation rate or relation time of the more slowly relaxing component can be determined directly from $S_2$ by measuring the slope. A similar measurement can be made to determine the relaxation time and relaxation rate of the more rapidly relaxing component by eliminating the more slowly relaxing one. The two values of the relaxation rates can be combined with the measured value of $r_0$ to determine the amplitudes of the two components of the response function.

It is also possible to adjust the duration of $H_{P2}$ so that the total polarization is exactly the amount in equilibrium with $H_r$ or a very small amount less. In this case the component with the larger relaxation rate makes a negative contribution which cancels the contribution of the more slowly relaxing component at $t=0$. However, the curve $P(t)-P(\infty)$ rises to a maximum and decays again as shown in FIG. 6. In many cases the amplitude of the maximum of the curve of FIG. 6 can be used as a measure of the difference between the two relaxation rates.

It is often the case that the response function for a sample contains more than one component of approximately the same relaxation rate for relaxation at a certain value of the relaxation field $H_r$. However, it is also common for the measurements of relaxation involved in our invention that the part of the sample which contributes a component with a certain relaxation rate at one value of the field $H_r$ will contribute a component of entirely different relaxation rate for relaxation at some different value of the relaxation field. That is, the response functions for many of the samples involved in the procedures of our invention are field dependent. It is often the case that the response function contains components of nearly the same relaxation rate at the field for which data are desired. However, it is often possible to eliminate or nearly eliminate one of these components by subjecting the sample to a value of the magnetic field at which one of the components has a relaxation time much shorter than the other for a fixed period of time after the end of the time of application of the relaxation field $H_r$ and before the signal is observed. This might, for instance, correspond to the method of FIG. 2*b*, in which $H_P$ is the relaxation field which is applied for different lengths of time in successive observations of the signal and where $H_L$ is a field at which the relaxation rate of the component or components to be eliminated is higher than that of the other component or components. Thus, a relaxation curve can be obtained representing principally the desired components.

It has been shown that it is very simple to determine relaxation rates of the most slowly relaxing component in cases where all other components relax much more rapidly. It is also possible to determine the relaxation rate and relative amplitudes for the most rapidly relaxing component when the others all relax much more slowly. This can be done from the relaxation curve approximately equivalent to the response function by determining a correction to the relaxation curve from the part of the curve in the region where $t$ is greater than several relaxation times for the rapidly relaxing component and substantially less than the relaxation time of the next shortest component of appreciable amplitude. If these conditions can be met, this part of the relaxation curve on semi-log graph paper is approximately straight and can be extrapolated to $t=0$ to determine an amplitude and relaxation rate of an exponential correction to be subtracted from the relaxation curve to obtain a curve for the most rapidly relaxing component.

In the above case, it is also possible to discriminate heavily in favor of the rapidly relaxing component by using the method of FIG. 2*b* in which the polarizating field $H_P$ is applied for only a short time (about a relaxation time for the rapidly relaxing component) and then $H_L$ is applied as the relaxation field. If $H_r$ is a strong field, the method of FIG. 2*g* can be used, where $H_L$ is $H_r$ and is slightly smaller than $H_{P1}$, and where $H_{P2}$ is small. In either case the polarization at the beginning of the period for which the relaxation field is applied is farther from equilibrium for the rapidly relaxing component than for the others, thus enhancing the contribution to the relaxation curve by the rapidly relaxing component.

Another common type of sample gives a response function which has a distribution of components with relaxation rates centered about an average value $\bar{r}$. It is often desirable to know not only the average value of the relaxation rate, $\bar{r}$, but to know the width of the distribution of components. The distribution function $N(r)$ of the components of the response function is often approximately a normal, or gaussian, distribution:

$$N(r)C \exp -\frac{1}{2}[(r-\bar{r})/\Delta]^2$$

so that $$R(t)=C\int \exp -\frac{1}{2}[(r-\bar{r})/\Delta]^2 dr$$

where C is a constant. Assuming that the width $\Delta$ of the distribution in $r$ is small compared to $\bar{r}$, the following formula can be derived:

$$\ln R(t)=-\bar{r}t+\frac{1}{2}\Delta^2 t^2$$

Thus a plot of the function $(1/t)\ln R(t)$ gives $r$ as the intercept and $(\frac{1}{2})\Delta^2$ as the slope of a straight line. ln $R(t)$ means the logarithm to the nature base, $e$, of $R(t)$.

In the general case of non-gaussian distributions of components of the response function the expression for ln $R(t)$ contains terms in higher powers of $t$.

In explaining the above few typical cases of determining features of the response functions by experimental measurements we have referred to apparatus of FIG. 1 and the current and field form of FIG. 2. However, the above procedures pertain not only to the special apparatus described above, but also to various other types of apparatus already known, or easily adaptable to perform the methods of the present invention. Such modifications are within the skill of the art. For example, non-equilibrium polarization can be obtained not only by apparatus of the type described by us, but also by partially saturating a spin system with rf power where the spin system has a response function with more than one component. In still another method, the sample is moved with time through a suitable sequence of substatially constant fields. Thus the processes by which we are able advantageously to determine features of the response functions can be carried out using other types of equipment without departing from the methods of the present invention.

*Analytical apparatus for measurements of relaxation curves of small samples for relaxation fields of any strength*

As has been mentioned above there are methods and means known in the prior art which enable one to obtain relaxation curves at substantially any value of the relaxation field. However, in most of these devices the signal is observed from a polarization precessing in a magnetic field no stronger than the relaxation field.

Figures 4A, 4B:
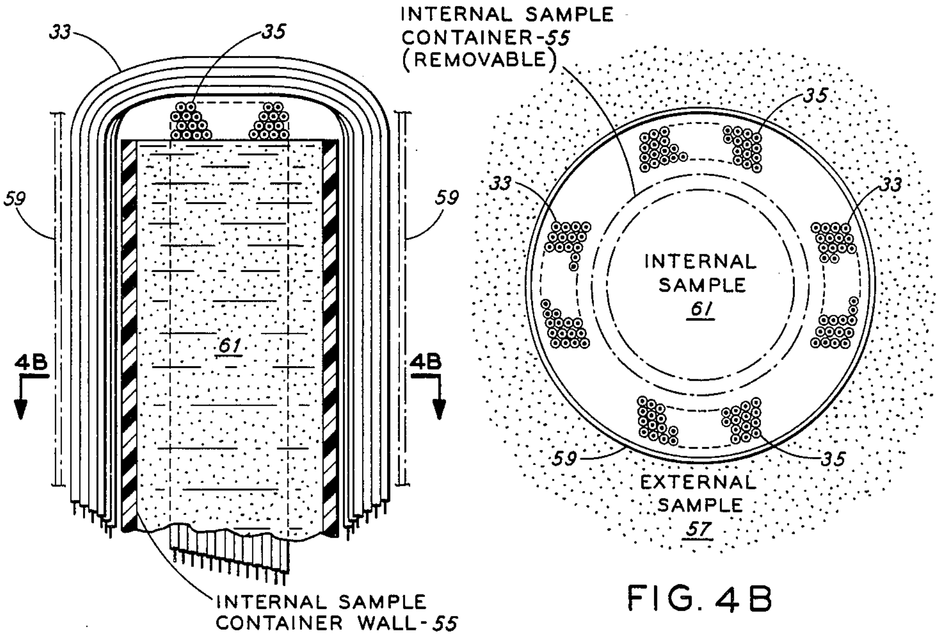
FIG. 4A is a partial side elevation view of a coil system for a low-field nuclear magnetism apparatus, as applied to an internal sample.
FIG. 4B is a sectional plan view taken in the direction of arrows 4B—4B in FIG. 4A, of a coil system as applied to an external sample.

Prior to our discoveries of the filed dependence of nuclear magnetism relaxation functions, it has been of little interest to measure relaxation curves, or even relaxation times, at weak relaxation fields. This is because the voltage induced by the precessing polarization in a detecting circuit is proportional to the precession frequency, among other factors. In turn, because the precession frequency is proportional to the absolute value of the magnetic field in which precession takes place, it is desirable that the polarization precess in as strong a field as possible during the time in which the signal is being observed. However, we have found that it is often important to measure relaxation functions in a weak field. In the apparatus shown in FIGS. 1 and 15 and described above, signal-to-noise voltage ratios of about one thousand are obtained, and higher ratios can be obtained with more polarizing power, for example, by increasing current in polarizing coil 33, or by using a narrower bandwidth (permissible for the longer relaxation times or for relaxation curves having single components). However, in the arrangement of FIGS. 1, 4A and 4B, the signal is observed from polarization precessing in the earth's field. This requires a rather large sample of material containing nuclei with magnetic moments. The internal sample volume of the particular coil assembly shown in FIGS. 4A and 4B is nearly ten liters.

*Porous media investigations*

It is well known that the number of protons or other nuclei having magnetic moments in a sample of matter can be determined by observing the strength of a signal induced by precessing nuclear magnetic polarization. To determine the amount of fluid in the pore space of a porous medium, it is possible to observe a signal representing the nuclei of that fluid and to determine from the magnitude of said signal the number of protons or other nuclei having magnetic moments in the entire sample or per unit volume of the sample. If the number of said nuclei per unit volume of fluid is known, then the ratio of the number of nuclei of the fluid in a unit volume of the porous medium to the number of nuclei per unit volume of the fluid in bulk is the volme of fluid per unit volume of the porous medium. This ratio is also the porosity of the porous medium where the pore space of the porous medium is completely filled with fluid.

When the porous medium is not already filled with a fluid, and it is desired to determine the porosity, it is usually a simple matter to saturate the medium with a fluid. If the solid material also has protons or other detectable magnetic nuclei, the transverse relaxation times of the components of the signal representing the nuclei in the solid will be very much shorter than those representing the nuclei in the fluid. Thus it becomes a simple matter to distinguish between the two groups of nuclei, or to observe only the group of nuclei having the longer transverse relaxation times.

When the surface effects of the porous medium make the thermal relaxation times for nuclei in the fluid inconveniently short, then longer times can be obtained by making the measurements at a relatively high magnetic field strength. Because the strong magnetic field has little effect on the transverse relaxation times $T_2$ of the fluid in the porous medium, the present invention makes possible separation of the contributions to the signal by nuclei in the fluid and nuclei in the solid. This may be done merely by allowing the polarization to precess for a very short time before measuring a signal amplitude to determine numbers of nuclei on the basis of said signal amplitude. The precessing polarization dies out very rapidly for the nuclei in the solid part of the sample and for the part of the fluid influenced by the proximity of the solid.

By determining the strength of only those components of the polarization having relatively long relaxation times, it is often possible to determine what may be termed the "free fluid content" of a sample. Fluid that wets very small pores or that is in some kind of gel structure gives short relaxation times. Such fluid is often not easily removable. For instance, in oil bearing formations there may be fluids bound in clay structures, or there may be either water or oil in very small pores. In either case the fluid may be of no economic importance for the reason that the fluid cannot pass through the formation at an appreciable rate and therefore cannot pass into a well bore from where it can be brought to the surface. The fluid that is in the larger pores and which is not bound in a gel structure is the "free fluid" and has longer nuclear magnetic relaxation times. The porosity corresponding to the pore space occupied by the free fluid may be called the "free porosity."

In porous media there are often distributions of pore sizes, giving distributions of relaxation rates and, therefore, giving relaxation curves containing a distribution of components. Where the pores are interconnected, as they usually are, then it is not always clear just what unit of pore space qualifies as one pore. When the passageways connecting the various pores are so small that diffusion through the passageways is negligible during the measurement times, then the pores may be considered as separate in the present discussion. If the pore space is not divided into substantially separate pores, the pore spaces may be divided up into units such that diffusion from one extremity of the unit to another extremity in a few measured relaxation times is small but not negligible. For a fine, unconsolidated sand, this unit may be substantially larger than the grain size. Thus the effects of the interconnection of pore spaces are to average the surface-to-volume ratio over a substantial volume, decrease the spread in effective pore sizes, and decrease the corresponding spread in relaxation rates. For such a fine, unconsolidated sand we have found approximately exponential relaxation. With a gaussian distribution of fluid in the pores (or in the units of pore space defined above), as a function of the volume-to-surface ratio of the pores, then there will be a corresponding gaussian distribution of both the components of the response function and the components of the experimentally determined relaxation curves. We have shown that in this case the average relaxation rates are given by the relationship $(1/t)\ln R(t)=\bar{r}+\frac{1}{2}\Delta^2 t$, where the components of $R(t)$ have an average relaxation rate $\bar{r}$, and where the half-width of the distribution in relaxation rates is $\Delta$.

Where the experimentally determined relaxation curve is substantially equivalent to the response function, except that no data are available for times $t$ less than some time $t_d$, as often is the case, then $(1/t)\ln S(t)=\bar{r}'+\frac{1}{2}\ t$, where S is the same as determined from the response function and where $\bar{r}=\bar{r}'+\Delta^2 t_d$. Thus, by determining the parameters $\bar{r}$ and $\Delta$, one can determine average pore size of a porous medium, or the volume-to-surface ratio. Additionally, the width of the distribution in the volume-to-surface ratios can be determined. Sometimes a porous medium has some pores that are so small that the relaxation rates for the fluid in them are too high to be observed by a particular form of equipment. For instance, it is not always possible to determine points on a relaxation curve for values of $t$ less than some minimum value $t_d$. However, it is still possible to obtain some information about the existence of these small pores with the amount of fluid in the porous medium known. This is because it can be seen from the curve that the observed polarization, corresponding to the time $t_d$, does not correspond to that which would account for the known number of protons, or whatever magnetic nuclei are being observed.

As is well known in the oil industry, a knowledge of the average grain size and distribution of grain sizes of a porous medium composed of sand or any other kind of rock grains, together with a qualitative knowledge of the nature of the medium (for instance, a porous medium composed of sand grains cemented together, or a porous medium composed of sand grains not cemented together) is sufficient to determine the approximate value of the permeability of the material for the flow of fluids. The permeability of a porous medium depends more on the dimensions of the entrances and exits to the spore spaces than it does on the actual pore dimensions themselves. However, for general classes of porous media the pore dimensions are related statistically to the pore entrance and exit dimensions. A useful way to determine the permeability of porous media, for instance, of earth formations surrounding a well bore, is to determine the average volume-to-surface ratio and the width of the distribution of values of this ratio for the fluid in the pores and to relate these quantities to the permeability of the porous medium. For one particular example of such a relationship among permeability, grain size (proportional to pore size), and distribution of grain sizes (related to pore size and distribution of pore sizes), see Krumbein and Monk, Journal of the American Institute of Mining and Metallurgical Engineers, volume 151, page 53 (1943) (on page 359 of the reprinted edition).

For routine determination of permeability by obtaining nuclear magnetic relaxation curves, it is of course possible to relate the permeability of a given general type of material, directly to the average relaxation rate and the width of the distribution in relaxation rates, determined as described above.

*Relaxation conditions for well logging*

We shall discuss now the features of our invention that concern the application of nuclear magnetism to well logging. In particular, we shall treat modification of the relaxation conditions on nuclear magnetism: (1) to detect the presence of oil in a formation penetrated by a well bore; (2) to determine the quantity of oil present in the formation; (3) to obtain a measure of oil gravity; (4) to obtain a measure of formation permeability and porosity; and (5) to obtain information on the wetting properties of the formation. Each of the foregoing information logs are, of course, recorded in accordance with the depth of the formation in a well bore.

In well logging the procedure is first to obtain a polarization of the protons present in oil and water in the formation by means of magnetic fields produced by an electrical coil system within the well bore. Current flow in the coil is cut off to reduce the applied magnetic field, and then one observes the signals induced within the well bore by the precession of the previously induced proton polarization in the earth's magnetic field. One or more relaxation curves, as defined above, for the fluids present in the formation is determined, and the desired information is deduced from one or more of these curves. Since the relaxation curves are obtained, it matters little at what rate the actual observed signals decrease as functions of time except they must be of sufficient duration to permit accurate measurement of the initial intensities of the signals. Variations in the duration of each individual signal may be caused by variations in the magnetite concentration within the formation, for example, but are of no consequence so long as the initial amplitude of the signal can be deduced with accuracy.

The equipment used in logging operations is shown in FIG. 15 and employs the circuits and apparatus of FIGS. 1, 4A and 4B. The geometry illustrated in FIG. 4B can be used in which two coils are employed. The first of these coils 33 is used for polarizing the proton present in the water and oil of the formation. The second coil 35 has its plane perpendicular to the plane of polarizing coil 33 and is used as a signal detection or pickup coil. With this arrangement, no variation in signal intensity is brought about by gradual change of azimuthal orientation, or gradual rotation of the tool within the well bore. However, signal intensity is influenced by geomagnetic latitude with the intensity being equal to zero at the magnetic equator, assuming the well bore is vertical. An alternative arrangement, as shown in FIG. 15, permits use of a single coil to function both for polarization and signal detection. With this arrangement the signal strength varies somewhat with geomagnetic latitude, but even at the equator the signal strength is half its maximum possible value. The signal is still independent of azimuthal orientation of the coil in the bore hole.

Either arrangement can be used in well logging operations. Polarizing and relaxation magnetic fields with strengths that vary from values as low as about the same intensity as the earth's magnetic field (about ½ gauss) up to values of several hundred gauss or more are used.

It can be shown that the wettability properties of a porous solid containing a fluid or fluids have important effects upon the relaxation curves observed. With natural rock formations it is found that in the vast majority of instances the rock matrix is primarily water wettable. However, some oil wettable reservoir rock is known such as the Bradford sand in Pennsylvania and the limestone reservoir rock of Saudi Arabia. Therefore, the measurements possible in logging will be considered for both water wettable and oil-wettable rock matrices.

Figure 7:
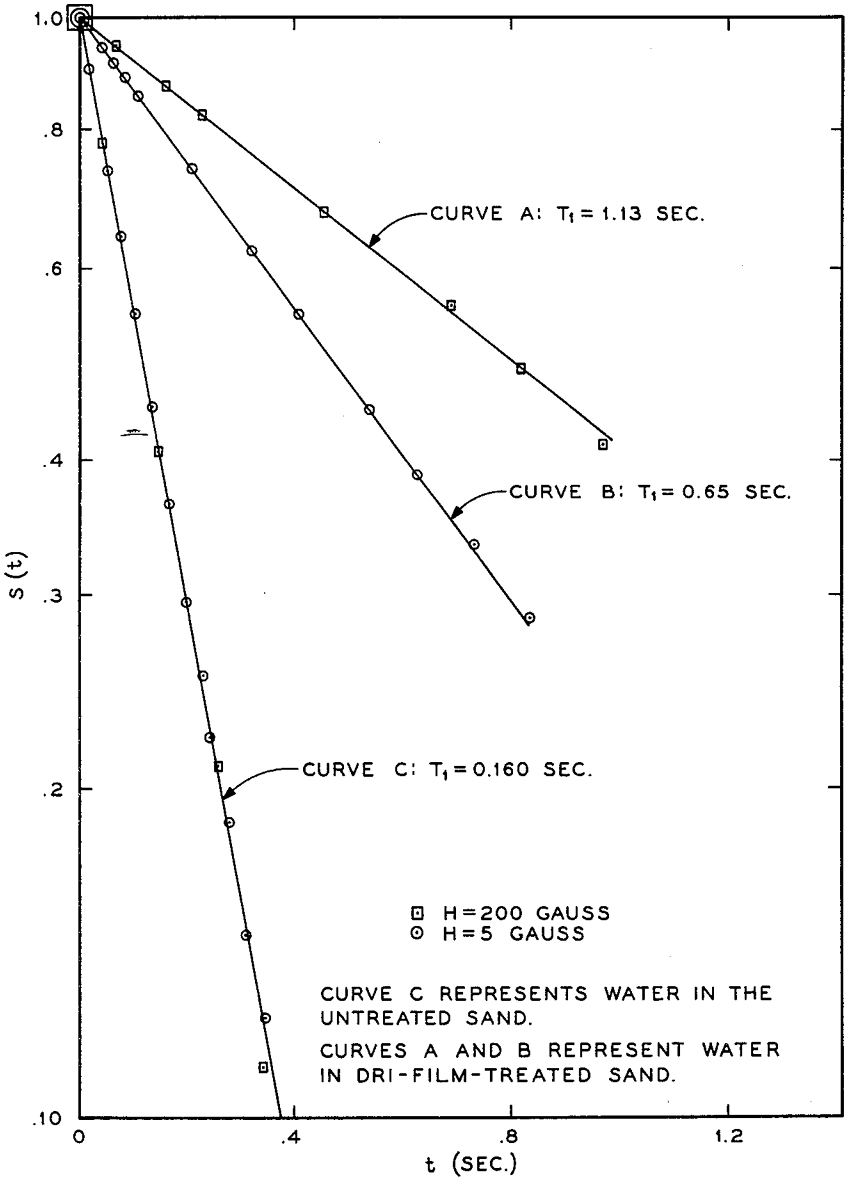
FIG. 7 shows relaxation curves for water in sand.

We shall review briefly at this point those facts discovered by us that are most pertinent to logging. Outstanding differences occur between the behavior of water and oil with respect to one or more of the nuclear magnetic relaxation curves. One of our most significant discoveries is that for water in water-wettable sand there is no dependence of the relaxation curve on the strength of the relaxation magnetic field except at very high field strengths. This is illustrated in FIG. 7 by curve C. In FIG. 7, relaxation curves are given for water in a sand pack for relaxation mangetic fields with strength of five gauss and 200 gauss. We have found that for water in water-wettable sand little or no dependence of the relaxation curve on relaxation field strength is found for field strengths of a few hundred gauss.

Figure 8:
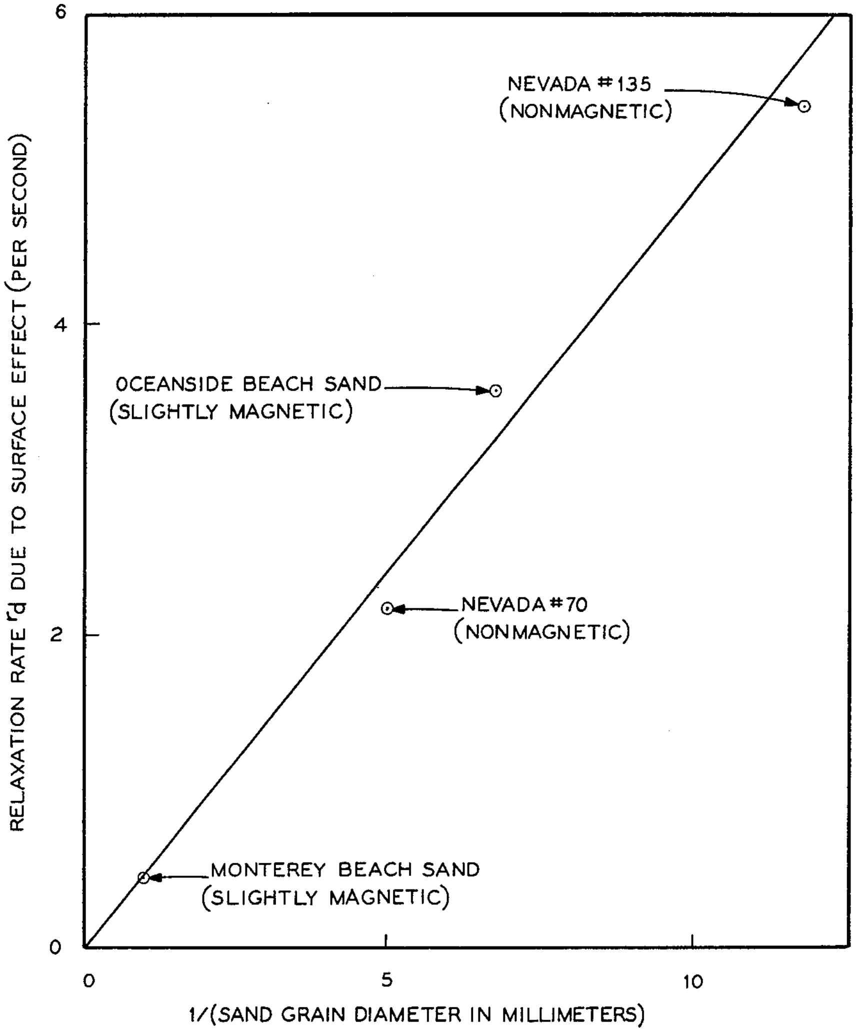
FIG. 8 shows relaxation by surface layers as a function of grain size.
Figure 14:
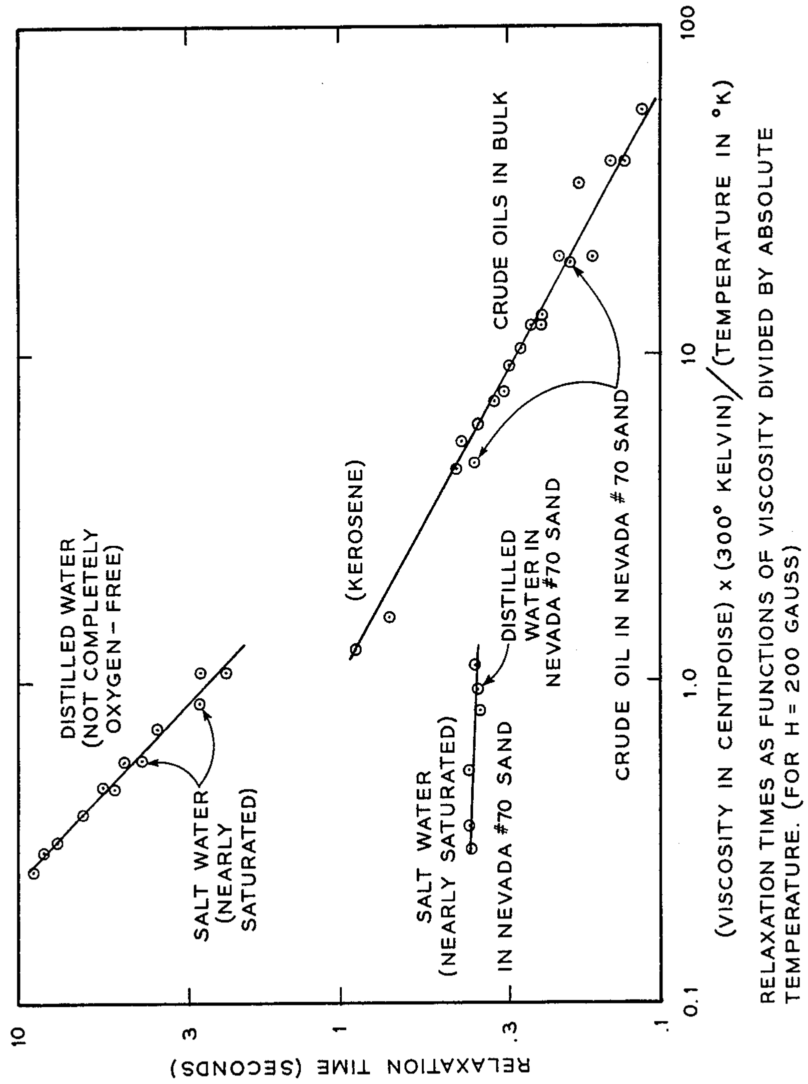
FIG. 14 shows dependence of relaxation times on viscosity.

A further outstanding property of water in water-wettable sands is that there is essentially no dependence of the relaxation curve on temperature as shown by the data presented in FIG. 14. The relaxation curve for water in water-wettable sand, of course, does depend on the effective pore size of the sand, i.e., the surface-to-volume ratio as shown in FIG. 8. Here the relaxation rate resulting from the liquid layer is plotted versus the reciprocal sand grain diameter for sand packs of various sand grain diameters. It is evident from the above that in logging, a measurement of surface-to-volume ratio for sand can be obtained. Due to the fact that the relaxation curve for water and water-wettable sand is highly sensitive to pore size, but is insensitive to temperature and strength of the relaxation magnetic field, the signal obtained from the water can be used to infer both the average pore size of the formation and the nature of the variation in pore size within the formation. Furthermore, the practicality of making this most important measurement is increased considerably by the fact that variations in the temperature of the earth formations are of little consequence.

The nuclear magnetic relaxation curve for water in oil-wettable rock is sensitive to the strength of the relaxation magnetic field as shown in FIG. 7, by curves A and B. Curves A and B were obtained after a normally water-wettable sand has been drifilmed to obtain preferentially oil-wettable coating on the sand grains. It is evident that the relaxation curve for water is sensitive to field strength for this situation and that an exponential relaxation process was obtained with $T_1$ equalling 650 ms. (milliseconds) in a relaxation magnetic field of 5 gauss and 1130 ms. in a relaxation magnetic field of 200 gauss.

Figure 9:
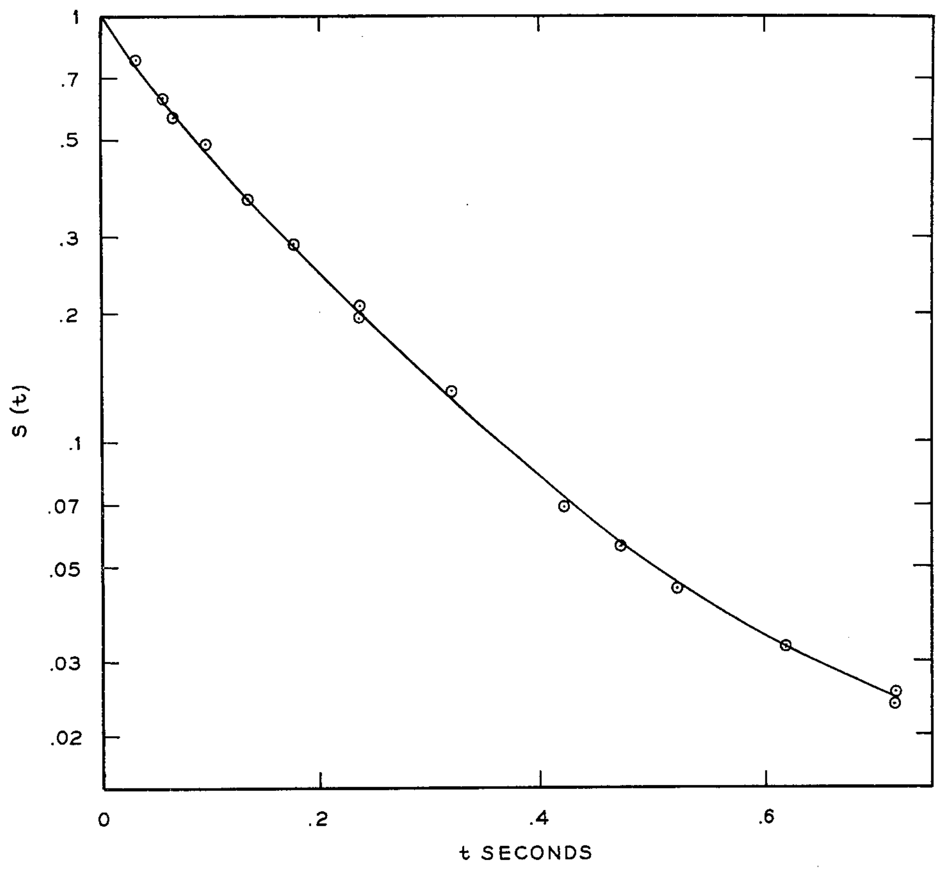
FIG. 9 shows a relaxation curve for crude oil.
Figure 10:
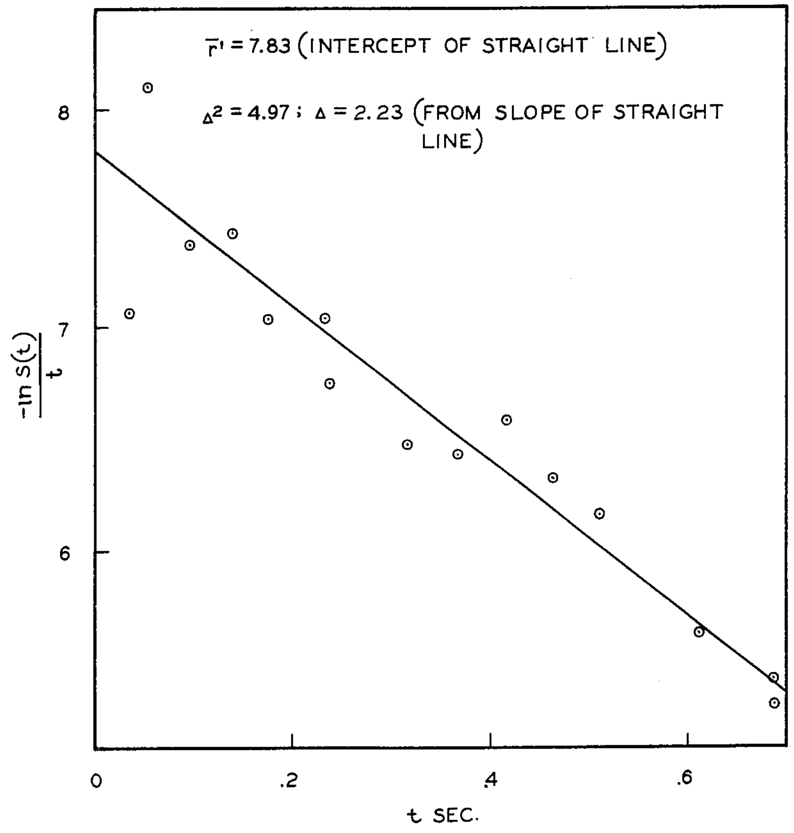
FIG. 10 is a plot to determine the distribution of components of the response function for a crude oil.

It has been found that whereas the relaxation curve for water in bulk is exponential, the relaxation curve for crude oil in bulk, in general, is not exponential. The relaxation curve obtained for one particular crude oil in bulk is shown in FIG. 9. Here the relaxation curve is plotted on a logarithmic scale versus the duration of the relaxation magnetic field. The relaxation curve is non-exponential and is compatible with the assumption that constitutents of the oil have various relaxation rates that are distributed over a Gaussian curve with an average relaxation rate of 8.0 per second and a half width, at 0.61 of maximum amplitude, of 2.2 per second. This information is plotted in a somewhat different form in FIG. 10. Here the time of duration of the relaxation magnetic field is divided into the natural logarithm of the relaxation curve and the quotient plotted versus the time of duration of the relaxation magnetic field. The data are seen to fit a straight line rather nicely implying that the distribution of the components comprising the response function is indeed well approximated by a Gaussian curve. In FIG. 10 $r'$ denotes the average relaxation rate initially and $\Delta$ represents the half width of the Gaussian distribution. From FIG. 10 we find that $r'$ equals 7.83 (intercept of extrapolation of straight line to $t=0$). We then find from the slope of the straight line on the figure that $\Delta^2=4.97$ and $\Delta=2.23$. In general, if the relaxation curve is Gaussian, the response function is also Gaussian and has the same width, but a slightly different central value.

Still another important observation of ours is that the nuclear magnetic relaxation rate of hydrocarbon liquids is proportional to the square root of the viscosity divided by absolute temperature of the hydrocarbon liquid.

A further observation of great importance that we have made is that in water-wettable sand oil contacting the sand, or contacting water, exhibits a strong dependence of the relaxation curve upon the strength of the relaxation magnetic field, whereas we have seen that water exhibits no such dependence. Let us refer to FIG. 11. Here data for a water-wettable sand are shown in which the sand was originally saturated with water and then flushed with a particular hydrocarbon liquid, No. 250 thinner. The relaxation curve is plotted on a logarithmic scale versus the duration of the relaxation magnetic field.

It will be noted here that the relaxation curves are not identical, of course, with the response function. In particular the data for a relaxation magnetic field of 200 gauss were obtained by applying a magnetic field of that strength for various time intervals, such as those illustrated in FIGS. 2*a*–2*b*, and subsequently measuring the amplitude of the signal observed from the precession in the earth's magnetic field in the manner shown in FIG. 3. For a relaxation magnetic field of 200 gauss, a correction had to be applied to account for the fact that the polarization decayed in the earth's field of approximately one-half gauss for a short time before observation of the signal. The delay was necessitated by the duration of the electrical transient engendered when the detecting circuit was switched into operation. This was one important correction made using a relaxation magnetic field with a strength of 200 gauss. The polarizing field and relaxation magnetic field were one and the same in that instance. In order to determine what fraction of the proton spins relaxed with comparatively higher or lower rates, allowance was made also for the fact that more of the polarization was lost for the components having short relaxation times than for the ones having longer times during the delay prior to signal observation. Once this correction is made to the relaxation curve, the response function is obtained. As explained previously, the repsonse functions represent the relative number of protons undergoing relaxation initially in the relaxation magnetic field. In the case of the five-gauss curve, polarization was accomplished first using a 200-gauss field; so a correction was applied at each end of the relaxation period in order to obtain the response function.

Figure 11:
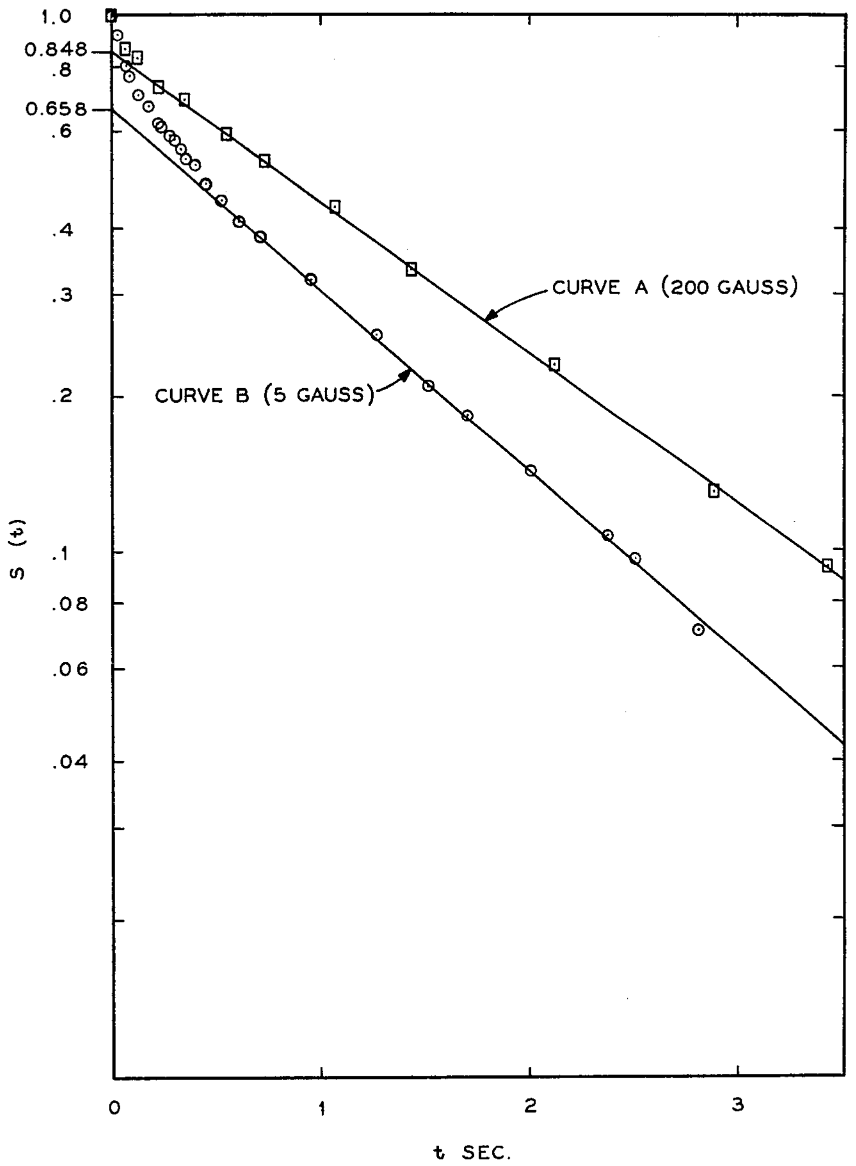
FIG. 11 shows the relaxation curves for oil and water in sand.
Figure 12:
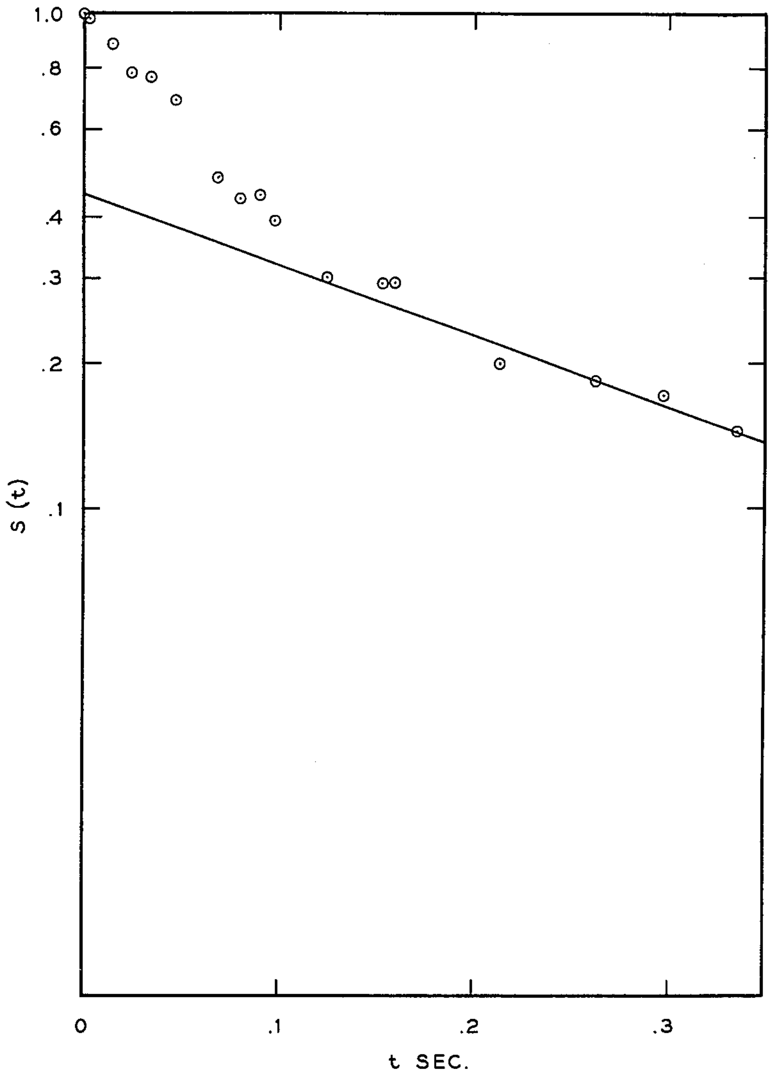
FIG. 12 shows a partial relaxation curve for oil and water in sand.

For those instances in which separate fluid phases are present having separate relaxation times, the numbers of protons relaxing at the various rates may be determined by extrapolating the straight-line portions of plots of $S(t)$ versus $t$ back to $t=0$, as shown in FIG. 11. In the system for which data are shown in FIG. 11, the fluid present was 31 percent water and 69 percent oil by volume. Now, curve A shows that 84.8 percent of the polarization represented at $t=0$ decayed with a relaxation time $T_1=1.54$ sec. at 200 gauss. The straight line through part of curve B shows that 65.8 percent of the initial polarization decayed with a relaxation time $T_1=1.26$ sec. at 5 gauss. A further analysis of curve B is shown in FIG. 12. The curve of FIG. 12 was derived from the curve B in FIG. 11 by subtracting 0.658 exp $(t/1.26)$ and renormalizing to unity for $t=0$. Extrapolation of the straight-line portion of the right-hand side of the curve shows that the portion of the curve represents the relaxation of 43 percent of the polarization represented in this plot at $t=0$. The corresponding relaxation time is $T_1=0.30$ sec. (probably there is a distribution of relaxation times of the order of 0.3 sec.). If this curve is to be fitted with exponentials of just two relaxation times, then from the straight lines shown and from the initial slope it can be seen that the remaining 67 percent of the polarization represented here relaxes with $T_1=0.066$ sec.

If the three components of the signal at the three different relaxation times discussed just above are corrected for the delay in observing the individual signals on the oscilloscope, then it is found that the following percentages of the protons have the following relaxation times at 5 gauss and 200 gauss.

| 5 Gauss | | 200 Gauss | |
|---|---|---|---|
| Percent of Protons | $T_1$ sec. | Percent of Protons | $T_1$ sec. |
| 28.5 | 0.066 | 31 | 0.066 (approx.) |
| 14 | 0.30 | 69 | 1.54 |
| 57.5 | 1.26 | | |

It is evident from the above analyses that for the 200-gauss field the relaxation process for water is exponential with $T_1=0.066$ sec. (or 66 ms.) and the relaxation process for oil is exponential with $T_1=1.54$ sec. For a magnetic field of 5 gauss the relaxation time for water may still be represented by an exponential process with $T_1=66$ ms. The oil now displays two exponential relaxation times with one portion having $T_1=300$ ms. and the other larger portion having $T_1=1260$ ms. It seems quite plausible that the portion of the oil having $T_1=300$ ms. contacts the sand grains whereas the portion having $T_1=1260$ ms. is in the form of droplets entirely surrounded by water. This analysis is in agreement with the theory that oil contacting sand grains has a more developed viscous layer at the oil-sand interface than would be found at the otil-water interface.

It is evident from the above that the relaxation process for oil is usually dependent on the strength of the magnetic field for strengths of the order of those used in these experiments, whereas the relaxation process for water is not. It is seen further that the field dependency of the relaxation process for oil may be utilized to distinguish oil from water, particularly so for light oils in which the relaxation process is controlled by the viscous layer of oil at the interface between the oil and the porous media wherein the fluids are present. It is seen also that the relaxation curves make an accurate quantitative measure of the amount of the various fluid phases present, so that an accurate measure can be made of the relative quantities of oil and water present. This completes the review of those of our observations most pertinent to logging. Specific logging procedures will be discussed now.

An extremely important application of the methods delineated just above is the unambiguous diagnosis of the presence of oil zones in earth formations penetrated by a wildcat well. The detection of these oil zones by any of the methods known and used heretofore is generally made difficult by the phenomenon of invasion. Invasion is the flushing of the formation immediately adjacent the well bore by drilling fluid filtrate. However, with the present invention, for a formation with a porosity of 20 percent, and for a residual oil concentration in the invaded zone of 10 percent, apparatus similar to that discussed above provides a signal-to-noise ratio of at least twenty-to-one. Therefore, this log is capable of diagnosing the presence of oil in the presence of severe invasion by virtue of the residual oil always present. On the other hand, such residual oil may well be imperceptible on other logs, such as electric logs.

For lighter crude oils the presence of oil is readily determined from the fact that the relaxation processes occur over much longer times for oil than for water. For example, as shown in the foregoing table for water and oil present together in water-wet sand the relaxation times for water is of the order of 50 ms., whereas for oil it is of the order of several hundred ms. or longer. Furthermore, under downhole conditions, crude oil often contains on the order of 20 percent by weight of dissolved hydrocarbon gases. These gases decrease the viscosity of the oil, and, as mentioned above, relaxation rate is proportional to the square root of the viscosity of the oil. Furthermore, hydrocarbon liquids completely devoid of molecular oxygen have slower relaxation processes than oils containing traces of molecular oxygen, such as those used to obtain data for the figures discussed above. In addition, in consolidated rock the shapes of the pores are often such that they are pancake-like in appearance with the smallest dimension of the order of one micron. A representative thermal relaxation time for water in such pores would be of the order of ten milliseconds, whereas for light oils it would be of the order of 100 milliseconds. Hence, in view of the above facts, in many instances in logging, light oils may be distinguished from water by the presence of two fluid components containing protons having widely different relaxation rates, the longer of which will represent the oil present.

In those instances in which there is no obvious indication of the presence of two components of the fluid having separate relaxation rates, the presence of oil may often be determined by observation of a dependence of relaxation rate upon the strength of the relaxation magnetic field. For example, for viscous oils in large pores, the relaxation rate in a particular relaxation magnetic field may be approximately equal to that of the water. However, because of the field dependence of the relaxation process for oil, the strength of the relaxation magnetic field may be changed and the presence of oil deduced from an accompanying change in the relaxation curve. This principle can be applied for all oils that are not so heavy in grade that the size of the pore spaces in the rock is too large (or, that is, the surface-to-volume ratio for these pores is too small) for the relaxation rate of the oil to be controlled primarily by the viscous layer of oil at the interface between the oil and either the rock or water.

The relaxation for water in sandstones is often very close to exponential even though there is a distribution of pore sizes, because the pores are connected thus a very small pore might be connected to a large pore, making relaxation in the small pore slower and relaxation in the large pore faster. For those heavy oils in which the viscous layer is little evident, the relaxation processes are approximately that for the bulk oil. In this situation, the presence of oil may still be inferred from the fact that the response function for oil is not exponential as indicated by FIG. 9 and FIG. 10 above. If the pores of the formation are rather large, so that the relaxation processes for water are comparatively long, then extremely heavy oil would display a relaxation rate faster than that for water and, furthermore, be distinguished from water by a distribution in relaxation rates.

It may oftentimes be difficult to distinguish water from oil for a particular strength of the relaxation magnetic field because the relaxation rates for oil may be nearly the same as for water. However, it has been taught above that proper manipulation of both the polarizing and relaxation magnetic fields can be utilized to distinguish the presence of two components having relaxation rates differing by small amounts. Therefore, this procedure can be utilized in logging to distinguish oil from water for those situations when the relaxation rate for oil is nearly the same as for water.

Extremely viscous oil may not provide an observable signal in logging with a given instrument bacuse relaxation rates may be too high. However, even for this situation the presence of oil may be inferred by first using the measurements made with water component to obtain a measure of the pore size of the formation and then comparing this measurement with actual pore size observed from drilling chips. A significant discrepancy may indicate the presence of oil. A still different procedure for determining the porosity of the formation includes measuring density of the drilling chips, or by an in-situ density log, or other means, and then comparing this value with the "free" porosity indicated by the total strength of the signal obtained in nuclear magnetism logging. A discrepancy between the specific pore volume and the quantity of liquid present per unit volume indicated by the nuclear magnetism signal indicates the presence of an extremely viscous oil not providing observable signals.

It has been shown above, in connection with FIGS. 11 and 12, that an accurate measure of the relative quantities of oil and water, present together in an earth formation, can be obtained from nuclear magnetism measurements. In logging, the value of these measurements is limited to some extent by the fact that the measurement primarily is in the invaded zone, where the relative concentrations of oil and water are different from those occurring before the presence of the well bore. However, using the measured values in the invaded zone, relationships are known in the art of oil reservoir engineering to make it possible to infer the water and oil saturations for the undisturbed reservoir. Consequently, the capacity of this logging method to provide values for the water and oil saturations, even though primarily for the invaded zone, is of importance.

The specific measurement procedure in logging in many instances would be as follows: With apparatus of the type illustrated in FIGS. 4A and 4B suspended in the well bore at the lower end of a well logging cable, the polarizing field is pulsed on for a given time; then the relaxation magnetic field is pulsed on for a selected time; and finally the signal is observed and the initial amplitude of the signal inferred. Repeated measurements with various times of duration of the relaxation magnetic field permit construction of the relaxation curve. This process can be carried through to completion by a simple procedure in which oscilloscope photographs are used to measure signal intensity, a separate series being required for the determination for each relaxation curve. More complicated automatic systems for plotting the desired relaxation curves directly from the observable data may be used to increase the speed of the method, but such schemes will not be described in detail in this patent. Typical values for the duration of the polarizing field and relaxation magnetic field might be one second and fifty ms., respectively. However, values of the duration of these fields, are varied over an extremely wide range and sometimes necessarily so to distinguish oil from water when the relaxation time for oil is approximately the same as that for water.

For a formation of uniform pore size, it is possible effectively to eliminate the signal from water, leaving only signals from oil by the procedure described previously for eliminating one component of the relaxation curve. The polarizing field is applied to the formation for a given time and then reversed with respect to the relaxation field for a time just long enough to bring the polarization of the water component of the fluid to equilibrium with the relaxation field, at which time the polarizing field is switched off. The signal is then observed. For a formation of uniform, known volume-to-surface ratio, this procedure can be used effectively to obtain relaxation curves representing only oil. If in this case the relaxation field is zero, then the presence of any signal at all is an indication of oil. Generally, of course, the pore size and the other factors affecting the relaxation time of water are not accurately known, so that in practice this procedure may be employed to reduce greatly the signal intensity from the water as compared to oil, rather than to eliminate it entirely, thus permitting observation of comparatively weak signals from oil.

It is also possible to vary the temperature of the formation surrounding a well bore. The temperature of the drilling fluid can be changed, as one method of changing the formation temperature. In fact, it is often the case in deep wells that the temperature surrounding the well bore is lowered for a short period of time merely by normal circulation of the drilling fluid. This is because downhole temperatures are much higher than the surface temperatures to which the fluid is exposed in the course of its circulation. It is possible in this way to change purposely the temperature of the drilling fluid to permit investigation of the effect of temperature on the nuclear magnetic relaxation properties of the fluids in the porous formations surrounding the well bore. Furthermore, it is sometimes the case that there is particular interest in a particular small depth interval of a wildcat well. In these cases, it is possible to heat or cool the formation adjacent the well for a small interval by a number of means. It is possible to introduce coolants such as liquid gases or the like. It is also possible to equip the logging tool with a burner; various underground burns are known in the oil industry and used for other purposes. If relaxation times are identical for water and oil at one temperature in an underground formation, then it is substantially certain that the relaxation times are different at a different temperature.

Partly by way of summary, there are at least three general results of the nuclear magnetic relaxation measurements which would indicate oil in an underground formation.

(1) Appreciable dependence on the relaxation field strength indicates oil. The only circumstance under which the relaxation curves for water could show field dependence except at very high fields would be if water were in contact with an oil-wet formation, and this situation does not occur.

(2) If data are obtained at more than one temperature, then appreciable temperature dependence of the relaxation curves indicates presence of oil, except in the case where the water is in droplets in oil where the oil wets a preferentially oil-wettable formation. (In this case, however, the field dependence is so strong that there can be no confusion so as to what part of the signal represents oil.)

(3) The appearance of more than one component to the relaxation curves indicates oil except in a few formation types, primarily vugular carbonate reservoirs. It is possible to obtain a distribution of relaxation rates for water in a porous medium as has been explained above, but this distribution is rather narrow in most sandstones. In vugular limestones, however, it is possible to have some pores which are very large and some that are very small.

In the case of water-wet limestone some indication of the presence of oil can often be gained from the field dependence. Another possibility is to flush the formation with a material containing colloids paramagnetic ions or molecules more soluble in the water than in the oil. Often the approximate oil gravity and, therefore, relaxation times, are known, or the pore sizes of the vugular formation are known.

It is possible in sandstones, or any formation, that there should be no field dependence and only one relaxation time observed. The possible presence of oil can generally be proven, or can be ruled out, if observations can be made at more than one temperature, but this is often not convenient for well logging. This "coincidence" arises when water and a rather viscous oil are together in rather large, but uniform, water-wet pores. The two fluids can be distinguished if data at more than one temperature can be obtained. Another possibility is the poisoning of the formation with a paramagnetic material soluble only in one of the fluids.

There are a number of other important applications of nuclear magnetism measurements in logging that are not primarily for the detection of the presence of oil, but for the measurement of other factors of interest. For example, frequently the permeability of the formation penetrated by the well bore can be determined from nuclear magnetism measurements. First, the pore size, or volume-to-surface ratio, is determined from the signals observed from water. In a water sand the pore size may be inferred directly from the relaxation rate for the water signal. For oil sands the pore size must be determined first by determining the effective pore volume for the spaces containing water. Then the relative quantities of oil and water present are determined from the relative initial intensities of the signal from oil and water. Next the ratio of the volume of the entire pore space to the volume occupied by water is calculated. (Thus the effective pore size, or volume, may be determined either in a water sand or an oil sand.) Finally, the well-known relationship between the size of the pores and the permeability of the formation is applied. This procedure is valid in many instances, where knowledge of the pore size distribution for a formation provides a good measure of the permeability of the formation. Permeability is an extremely important quality, since it alone may determine whether or not an oil zone is a commercial oil zone. Yet, prior to this invention, there has been no generally satisfactory method available for determining such formation permeability.

It should be noted here that the duration of the nuclear magnetic precession of protons in the earth's magnetic field will be sufficiently long that observable signals may be obtained only if the fluid is present in pores having their minimum dimension greater than a certain distance of the order of some fraction of a micron. It so happens, further, that fluid is free to flow from pore to pore only if the minimum dimension of the pores is at least of the same order of magnitude as this fraction of a micron. Therefore, in one sense the nuclear magnetism log is a log of the amount of fluid present that is free to flow; in other words, it is a log of free fluid. This concept is in agreement with the concept that the nuclear magnetism log can provide a measurement of permeability.

Figure 13:
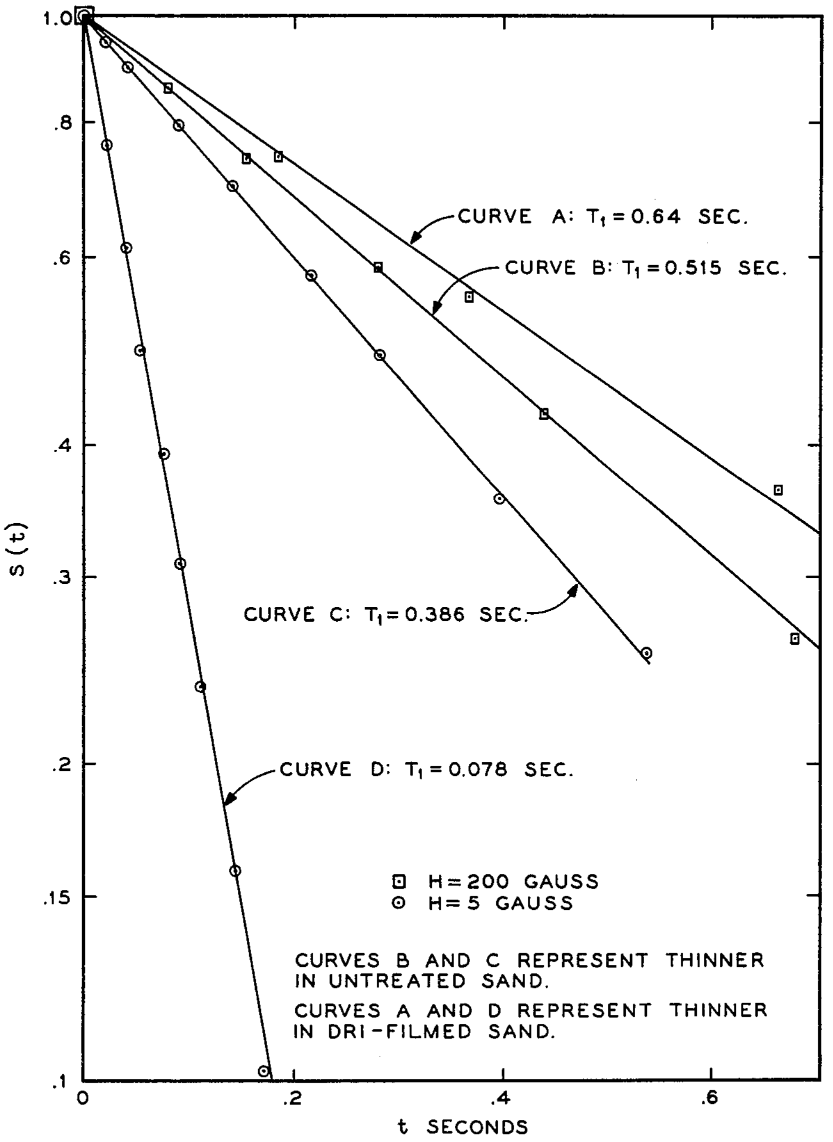
FIG. 13 shows relaxation curves for a light hydrocarbon thinner in sand.

A nuclear magnetism logging, performed in accordance with our invention, can be used to obtain information on the wettability properties of the rock matrix of an oil-containing zone. Such information is important because the value of the resistivity index used in electric log interpretation is controlled by the wettability properties of the rock matrix. In nearly all oil reservoirs the rock matrix is preferentially water-wettable, and the procedures used in electric-log interpretation to determine oil saturation have been developed for preferentially water-wet rock. However, in certain reservoirs such as in the Bradford sand in Pennsylvania and in limestone reservoirs in Saudi Arabia, the rock is known to be oil-wet. Knowledge of the wettability conditions of the rock matrix insure against misinterpretation of the fluid content of the rock and permit a much more accurate determination of the fluid saturations in preferentially oil-wet reservoir rock. Now, knowledge of wettability conditions of the rock matrix can be inferred from the rate of nuclear magnetic relaxation for both oil and water and from the dependence of these rates upon the strength of the relaxation magnetic field. We have seen previously in FIG. 7 that for preferentially oil-wet rock the relaxation processes for water are considerably slowed down (oil-wettability was obtained by drifilming the sand). Furthermore, the water exhibits a dependence or relaxation rate upon the strength of the relaxation magnetic field when contacting such rock, as illustrated in that figure. Note that a striking dependence of relaxation rate on the strength of the relaxation magnetic field is observed for oil in preferentially oil-wet sand as shown by the data of FIG. 13. It is apparent that in a relaxation magnetic field having a strength of about five gauss the relaxation rate of the oil is extraordinarily increased over that for the oil on a clean-sand surface. In fact, it is characteristic of preferentially oil-wettable reservoir rock that the relaxation processes for oil are greatly shortened in time for that oil contacting rock and the relaxation processes for water are considerably lengthened in time. Measurements of the relaxation curve for a number of strengths of the relaxation magnetic field may be thus utilized to define rather well the degree of water wettability or oil wettability of the rock. In many instances it is found that a fraction of the rock surface is preferentially water wet. A study of a series of relaxation curves for various relaxation magnetic field strengths can be used to infer the fraction of the surface that is preferentially oil wet in such instances.

A measure of the gravity of the oil present in a formation penetrated by a well bore can be obtained from nuclear magnetism measurements made in accordance with our invention. First, the relaxation curve is determined. The pore size of the rock is then determined separately from observations of signals obtained from water present in the formation. Next, the response function for the bulk oil is inferred from the pore size data and from a relaxation curve for the oil present in the formation. Once the response function for bulk oil has been calculated, one may readily obtain a rather accurate value for the viscosity of the oil using our observation that the rate of relaxation for bulk oil is proportional to the square root of the viscosity together with a known rate for a particular viscosity. We have measured a curve, giving the relationship between the rate of relaxation and the viscosity of the oil and this is shown in FIG. 14. In the in situ viscosity of the oil as affected by dissolved hydrocarbon gases is obtained by this procedure. The oil gravity that would be obtained for a sample present at the earth's surface may be inferred by using well-known graphs relating viscosity and gravity, and also accounting for the change in viscosity with the loss of the hydrocarbon gases when the oil is brought to the surface.

Also shown in FIG. 14, as mentioned previously, is a curve illustrating the fact that water wetting a preferentially water wettable porous rock does not experience variations in the relaxation rate resulting from temperature changes. For this reason, it is a relatively simple process in logging to obtain pore-size distribution data on reservoir rock using a signal from water, It is to be noted from FIG. 14 that there is a strong dependence of the relaxation rate of bulk water on temperature and it is to be stressed that the non-temperature dependence of the relaxation rate for water in normal sands is a peculiar circumstance explained by the theory developed herein that is exploited in the present invention to enable simple, accurate measurements of pore size distribution data for reservoir rock.

Oil-filled applications, other than detection of the presence of oil and measurement of the porosity and permeability of earth formations penetrated by a well bore are readily apparent as a result of the concepts of this invention. For example, one may construct a so-called "water witch" capable of making accurate measurements of the relative quantities of water and oil present within the well bore itself. Electrical coils or permanent magnets may be used in the instrument to obtain nuclear magnetic precession of protons in water and oil in either uncased or cased wells, whereas the instrumentation for detecting oil in formations is normally operable only in uncased wells. The polarizing magnetic field and relaxation magnetic fields are operated in a manner similar to that described above, and from the relaxation curves obtained, one may readily determine the relative amounts of water and oil present within a sample reservoir built within the logging instrument, having a capacity of the order of a few cubic inches. The reservoir is provided with upper and lower openings so that as the tool traverses the well, fluids in the well flow in and then out of the sample reservoir. In this manner fluids present in the reservoir within the tool will be representative of the fluids in the well bore at the position of the instrument. Such an instrument has the advantage that measurements are made with water and oil present simultaneously, without difficulty from fouling of electrodes by oil, or from convection currents in the water and oil. Such difficulties constitute important disadvantages of present water witching systems.

Similar instruments may be installed in surface tanks or pipe lines to provide a continuous measurement of the relative quantities of oil and water present. Such instrumentation, not heretofore available, is needed badly for efficient handling of crude oils in surface processing work.

*Applications of new results*

In oil well logging it is now possible by our invention to detect unambiguously the presence of oil when it is present in appreciable quantity. First of all, the nuclear magnetic signal from oil shows a change in relaxation time as the strength of the relaxation magnetic field is changed (field dependence), whereas the signal from water shows no such change. Secondly, for light oils, we have found that some of the oil is completely surrounded by water and has one relaxation time, whereas a second part of the oil touches the rock and has a different relaxation time. For very viscous oils the change in relaxation time brought about by the boundary layer itself as magnetic field strength is changed may be inappreciable. For viscous oils, however, it is found from measurements on the oil in bulk that a nonexponential relaxation is observed, and hence for viscous oils in porous media observation of such nonexponential relaxation is indicative. The distribution of pore size of the formation is determinable from the water signal because the water signal is not influenced by temperature or strength of magnetic field but only by pore size and wettability properties of the formation. In water-wettable, water-filled sands, one can infer pore size distribution directly from the water signal. In oil sands, one can infer the amount of pore volume for the water and then by comparing the signal intensities from water and oil the amount of oil present can be measured. Then from the combination of water and oil signals one can determine the pore size distribution. Knowing the pore size of the formation and the relaxation time, or relaxation curve, for the oil, it is possible to deduce the viscosity of the oil, as well as the gas-oil ratio. Since pore size distribution generally is related rather well to formation permeability, except in vugular type formations and certain other unusual formations, the present invention provides a method to obtain a measurement of permeability under many situations.

*Resumé*

In conclusion it will be understood that the present invention relates to important discoveries in the use and manipulation of relaxation conditions to invesigate the fundamental properties of both porous media and fluids contained therein by means of the nuclear magnetic relaxation curves for one or more fluids in said media.

In recapitulation of the important terms defined in detail hereinbefore, we have used the above expressions as follows:

The term "porous media" is meant to include all materials having surface properties when in contact with at least one fluid. Said term includes such diverse materials as porous sandstone or other granular material, stacks of plates having intervening spaces, capillary tubes or cylinders, or materials with exceedingly small spherical volumes, as well as catalyst particles, colloidal suspensions, and liquids containing other liquids forming particles therein, e.g., emulsions, gels, crude oil, etc. The primary characteristic of all of said media is, of course, a large surface-to-volume ratio so that there is formed a layer of differing viscosity at the surfaces of the liquid volume, whether external or internal to said surfaces. In using the term relaxation condition, we mean to include the modification of the environment wherein the nuclear magnetic precession occurs. As used herein, this term includes both variations in the magnetic field conditions or variation in the temperature conditions for the porous media and fluid system.

Relaxation curves have been used to mean the actual values of the nuclear magnetism relaxation rates as a function of time in practical measurements, and response functions have been used to mean the relaxation rates as a function of time under idealized measurement conditions where relaxation is a function of the field or temperature conditions of the porous media and fluids under investigation. Where the term curve is used it will be understood that we intend to include the least number of individual measurements required to define the curve and independent of any exact number of such measurements.

Numerous modifications and changes in both the methods disclosed herein and the apparatus for performing said methods will occur to those skilled in the art from the foregoing specification. All such modifications and changes falling within the scope of the appended claims are intended to be included therein.

We claim:

1. A method for logging an earth formation from within a well bore penetrating said earth formation to determine the presence and molecular structure of fluid materials in said earth formation comprising the steps of:

(a) determining the relaxation rate for polarizable materials within said earth formation by providing an initial polarization of said polarizable materials, establishing a first relaxation field in said earth formation for said polarized materials, interrupting said relaxation field and initiating precession of said polarized materials in the earth's magnetic field, said establishing and interrupting steps being more than one establishment of said relaxation field each one following a reestablishment of said initial polarization and each followed by an interruption of said relaxation field, each of said more than one establishment being at the same field strength but for a longer time duration than the next preceding establishment, detecting spin magnetic induction signals from said precessing polarized materials after each interruption of said relaxation field, and determining from said detected precessional signals the relaxation rate for said polarized materials within the formation in response to said first relaxation field strength, (b) repeating said relaxation rate determination steps by providing the same initial polarization of said polarizable materials followed by a second relaxation field, said second relaxation field differing from said first relaxation field in field strength, said second relaxation field being established for the same number of establishments as said first relaxation field and each establishment being for the same time duration as said establishments of said first relaxation field, determining the relaxation rate for said polarized materials in response to said second relaxation field strength, (c) comparing said determined relaxation rates to identify a difference in said determined relaxation rates apparently dependent on the difference in said first and second relaxation field strength, (d) and correlating said identified relaxation field strength dependency indicated by differences in said relaxation rates with known geological materials capable of causing said differences within said formation penetrated by said well bore to determine the presence and molecular structure of said fluid materials.

2. The method of claim 1 with the additional steps of:

(a) repeated relaxation rate determining steps with additional different relaxation fields, each additional different relaxation field differing in field strength from the preceding fields, (b) comparing said determined relaxation rates from said repeated determining steps to identify relaxation field intensity dependency in separate relaxation rates for separate precessing polarized materials, (c) and correlating said identified separate field dependency relaxation rates to identify the presence of separate fluid materials within said formation.

3. The method of claim 1 with the additional step of varying the temperature of said earth formation during said relaxation rate determining steps to identify relaxation rates for said precessing polarized materials dependent upon said variations in formation temperature, and correlating said determined temperature dependent relaxation rates with known relaxation rate information to indicate the presence of at least two different fluid materials within said formation.

4. The method of claim 2 with the additional step of varying the temperature of said earth formation during said relaxation rate determining steps to identify relaxation rates for said precessing polarized materials dependent upon said variations in formation temperature, and correlating said determined temperature dependent relaxation rates with known relaxation rate information to indicate the presence of at least two different fluid materials within said formation.

5. A method for determining the presence of fluid hydrocarbons in a portion of a porous earth formation penetrated by a well bore comprising the steps of:

(a) subjecting said earth formation to a first magnetic field to induce polarization of protons within said portion of said earth formation, (b) then subjecting said portion of said formation to a second magnetic field selected for its combination of intensity and duration so that the resultant protonic polarization in said formation is reduced, said reduction being in greater degree in water protons than in hydrocarbon protons, (c) causing the resultant protonic polarization to precess in the earth's magnetic field, measuring the amplitude of the precessional signal obtained in a detection coil in said well bore adjacent said earth formation, (d) repeating said polarization and reduction steps with variations in said first magnetic field, then causing said precession and measuring the amplitude of the detected precessional signal from the resultant protonic polarization, (e) determining from said measured amplitudes the relaxation curve for said resultant protonic polarization, (f) repeating said polarization, reduction, precession and measuring steps with similar variations in said first field and at least another modified combination of intensity and duration for said second magnetic field to determine at least another relaxation curve for at least a different resultant protonic polarization, (g) and identifying among said relaxation curves those repeated steps that indicate the substantial elimination of precessional signals from water protons to determine directly and unambiguously the presence of fluid hydrocarbons in said formation.

6. The method of claim 5 wherein said second magnetic field is selected to have a polarity opposite to the polarity of said first magnetic field.

7. A method of well logging for determining unambiguously the presence of oil in an earth formation penetrated by a well bore comprising:

(a) subjecting said formation to a polarization and relaxation procedure employing a program of selected magnetic fields applied for predetermined periods to induce nuclear polarization and relaxation conditions and to establish a resultant polarization of the protons present in the fluids of the formation, said selected magnetic fields including at least one field controllable in both intensity and duration, (b) then removing said magnetic fields to permit said polarized protons to precess in the earth's magnetic field, (c) detecting signals induced by said precession in a pick-up coil, recording representations of said induced signals, (d) repeating at least once said polarization and relaxation procedure with the duration of said controllable magnetic field being changed for each repeated procedure, (e) after each repeated procedure, removing said magnetic fields to permit precession of the resultant polarization of said protons, (f) detecting signals induced by said precession in said pick-up coil, recording representations of said detected precessional signals for each of said repeated procedures, (g) determining from said recorded signals the rate of relaxation of the protonic polarization for said fluids in said earth formation, (h) then repeating the foregoing repeated polarization and relaxation procedure steps with said controllable magnetic field having a different intensity from that used in said first repeated steps to determine a second rate of relaxation of said resultant protonic polarization, (i) and determining the presence of oil within said formation from variations in the rates of relaxation of said resultant protonic polariaztion due to changes in intensity of said controllable magnetic field.

8. The method of claim 7 wherein the controllable magnetic field functions as both the polarization and relaxation field.

9. The method of claim 7 wherein the polarization field is made the same in both intensity and duration in each of said repeated procedures and wherein said controllable magnetic field is the relaxation field.

10. A method of oil well logging to distinguish between water and crude oil in an earth formation penetrated by a well bore, comprising the steps of:

(a) subjecting said formation to a polarization and relaxation procedure employing a program of selected polarization and relaxation magnetic fields applied for predetermined periods to induce nuclear polarization and relaxation conditions and to establish a resultant protonic polarization of the protons present in the fluids of the formation, said selected magnetic fields including at least one field controllable in both intensity and duration, (b) interrupting said selected magnetic fields to permit the resultant protonic polarization to precess in the earth's magnetic field, (c) detecting the signal induced in a detection coil positioned adjacent to said formation and responsive to said precessing protonic polarization, recording a representation of said signal, (d) repeating the entire procedure with said controllable magnetic field being varied for succesive repeated polarization and relaxation conditions, recording a representation of detected precessional signals following said repeated procedures, (e) constructing relaxation curves for said resultant protonic polarization in said formation from said recorded representations of induced signals as a function of variation of said controllable magnetic field, (f) determining from said relaxation curves the relaxation rate of said protonic polarization in said formation as a function of the variation of said controllable magnetic field, (g) and from said relaxation rate identifying the presence of water and crude oil in said formation by the existence of protonic relaxation at more than one rate with said rates attributable to two simultaneous protonic relaxations including one dependent upon variations in said controllable magnetic field and a second characterizing water and independent of variations in said controllable magnetic field.

11. The method of claim 10 wherein the controllable magnetic field functions as both the polarization and relaxation field.

12. The method of claim 10 wherein the polarization field is made the same in both intensity and duration in each of said repeated procedures and wherein said controllable magnetic field is the relaxation field.

References Cited by the Examiner

UNITED STATES PATENTS

| | | | |
|---|---|---|---|
| 2,968,761 | 1/61 | Zimmerman et al. | 324—0.5 |
| 2,973,471 | 2/61 | Armistead et al. | 324—0.5 |
| 3,083,335 | 3/63 | Schuster | 324—0.5 |

CHESTER L. JUSTUS, *Primary Examiner.*

MAYNARD R. WILBUR, *Examiner.*

UNITED STATES PATENT OFFICE
CERTIFICATE OF CORRECTION

Patent No. 3,213,356 October 19, 1965

Robert J. S. Brown et al.

It is hereby certified that error appears in the above numbered patent requiring correction and that the said Letters Patent should read as corrected below.

Column 3, line 67, for "P(O) and P(O)" read -- $P_{11}(O)$ and $P_1(O)$ --; column 5, lines 42 and 43, for "determined" read -- predetermined --; column 10, line 46, for "intsance" read -- instance --; column 12, line 13, for "set" read -- setting --; column 13, line 53, for "r", in italics, read -- $\bar{r}$ --, in italics; column 14, line 14, for "filed" read -- field --; line 56, for "volme" read -- volume --; column 15, line 66, for "1/2 t" read -- 1/2 $\Delta t$ --; column 16, line 21, for "spore" read -- pore --; column 17, line 49, for "mangetic" read -- magnetic --; column 18, line 5, for "has" read -- had --; lines 33 and 36, for "r′", in italics, each occurrence, read -- $\bar{r}'$ --, in italics; column 19, line 10, for "repsonse" read -- response --; column 20, line 2, for "otil-water" read -- oil-water --; column 21, line 37, for "bacuse" read -- because --; column 23, line 10, for "so as" read -- as --; line 65, for "quality" read -- quantity --; column 24, line 34, for "or" read -- of --; column 25, line 13, for "water," read -- water. --; column 29, line 27, for "succesive" read -- successive --.

Signed and sealed this 18th day of October 1966.

(SEAL)
Attest:

ERNEST W. SWIDER
Attesting Officer

EDWARD J. BRENNER
Commissioner of Patents